(12) United States Patent
Boucadair et al.

(10) Patent No.: US 11,979,276 B2
(45) Date of Patent: May 7, 2024

(54) METHOD FOR MANAGING AT LEAST ONE COMMUNICATION OF AN ITEM OF TERMINAL EQUIPMENT IN A COMMUNICATION NETWORK, METHODS FOR PROCESSING A COMMUNICATION ESTABLISHED WITH AN ITEM OF TERMINAL EQUIPMENT IN A COMMUNICATION NETWORK, CORRESPONDING DEVICES, ITEM OF TERMINAL EQUIPMENT, ITEM OF PROXY EQUIPMENT AND COMPUTER PROGRAMS

(71) Applicant: ORANGE, Issy-les-Moulineaux (FR)

(72) Inventors: Mohamed Boucadair, Châtillon (FR); Christian Jacquenet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/622,957

(22) PCT Filed: Jun. 24, 2020

(86) PCT No.: PCT/FR2020/051103
§ 371 (c)(1),
(2) Date: Dec. 27, 2021

(87) PCT Pub. No.: WO2020/260826
PCT Pub. Date: Dec. 30, 2020

(65) Prior Publication Data
US 2022/0239556 A1    Jul. 28, 2022

(30) Foreign Application Priority Data
Jun. 28, 2019    (FR) ...................................... 1907105

(51) Int. Cl.
*H04L 41/0806*    (2022.01)
*H04L 41/085*    (2022.01)
*H04L 43/0811*    (2022.01)
*H04L 61/251*    (2022.01)
*H04L 61/2553*    (2022.01)

(52) U.S. Cl.
CPC ........ *H04L 41/0806* (2013.01); *H04L 41/085* (2013.01); *H04L 43/0811* (2013.01); *H04L 61/251* (2013.01); *H04L 61/2553* (2013.01)

(58) Field of Classification Search
None
See application file for complete search history.

(56) References Cited

U.S. PATENT DOCUMENTS

2002/0078198 A1    6/2002    Buchbinder et al.
2007/0140159 A1    6/2007    Eronen et al.
(Continued)

OTHER PUBLICATIONS

English translation of the Written Opinion of the International Searching Authority dated Oct. 5, 2020 for corresponding International Application No. PCT/FR2020/051103, filed Jun. 24, 2020.
(Continued)

*Primary Examiner* — Mohamed Ibrahim
(74) *Attorney, Agent, or Firm* — David D. Brush; Westman, Champlin & Koehler, P.A.

(57) ABSTRACT

A method for managing a communication according to a transport protocol of a terminal equipment in a communication network. The method includes: detecting presence, on a path allowing the terminal equipment to be reached on a second IP address of the terminal equipment, of a status function which maintains a status associated with a communication on the path, including transmitting a first message from a first IP resource of the terminal equipment, including a first IP address and a first port number, to a second IP resource of the terminal equipment, including the second IP address and a second port number, and deciding on presence of a status function on the path according to data received by the second IP resource in response to the first message; and managing a communication of the terminal equipment on the path allowing the terminal equipment to be reached on the second IP address.

20 Claims, 12 Drawing Sheets

(56) References Cited

U.S. PATENT DOCUMENTS

Figure 1:
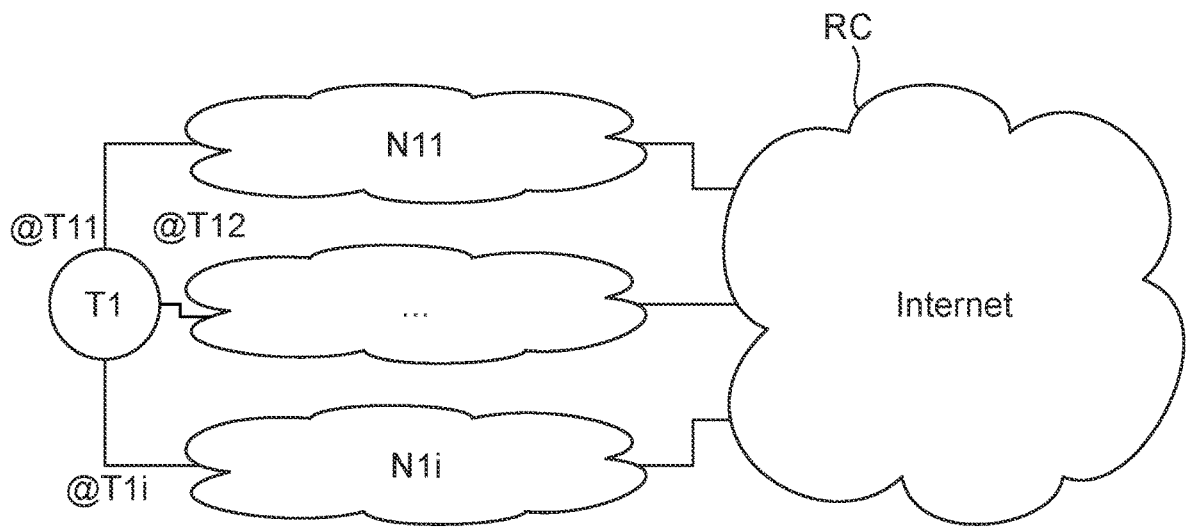

| | | | |
|---|---|---|---|
| 2017/0093961 A1* | 3/2017 | Pacella | H04L 41/5051 |
| 2019/0052711 A1* | 2/2019 | Kharlanau | H04L 67/1061 |
| 2019/0116123 A1* | 4/2019 | Shiell | H04L 69/161 |
| 2020/0008248 A1* | 1/2020 | Beck | H04W 76/15 |
| 2020/0120555 A1* | 4/2020 | Patil | H04L 63/0428 |

OTHER PUBLICATIONS

International Search Report dated Sep. 25, 2020 for corresponding International Application No. PCT/FR2020/051103, dated Jun. 24, 2020.

Written Opinion of the International Searching Authority dated Sep. 25, 2020 for corresponding International Application No. PCT/FR2020/051103, filed Jun. 24, 2020.

Rekhter et al., "Address Allocation for Private Internets", RFC 1918, published by the IETF in Feb. 1996 and accessible via the following URL: https://tools.ietf.org/html/rfc1918.

Farinacci et al., "Generic Routing Encapsulation (GRE)", RFC 2784 published by the IETF in Mar. 2000.

Eggert et al., "UDP Usage Guidelines", RFC 8085, published by the IETF in Mar. 2017.

Weil et al., "IANA-Reserved IPv4 Prefix for Shared Address Space", RFC 6598 published by the IETF in Apr. 2012 and accessible via the following URL: https://tools.ietf.org/html/rfc6598.

* cited by examiner

METHOD FOR MANAGING AT LEAST ONE COMMUNICATION OF AN ITEM OF TERMINAL EQUIPMENT IN A COMMUNICATION NETWORK, METHODS FOR PROCESSING A COMMUNICATION ESTABLISHED WITH AN ITEM OF TERMINAL EQUIPMENT IN A COMMUNICATION NETWORK, CORRESPONDING DEVICES, ITEM OF TERMINAL EQUIPMENT, ITEM OF PROXY EQUIPMENT AND COMPUTER PROGRAMS

CROSS-REFERENCE TO RELATED APPLICATIONS

This Application is a Section 371 National Stage Application of International Application No. PCT/FR2020/051103, filed Jun. 24, 2020, which is incorporated by reference in its entirety and published as WO 2020/260826 A1 on Dec. 30, 2020, not in English.

FIELD OF THE INVENTION

The field of the invention is that of a communication network and more particularly the management of communications of an item of terminal equipment in such a network.

The invention has a particular application in communication networks implementing value-added IP services.

PRIOR ART AND ITS DISADVANTAGES

The communication protocol, called QUIC, was designed to reduce the latency observed during communications based on the TCP (Transport Control Protocol) and in particular the time taken to establish a communication between a first item of terminal equipment, called a client or transmitting terminal or simply terminal, and a second item of terminal equipment, called a server or receiving terminal, via the communication network. For this reason, the QUIC protocol is based on the User Datagram Protocol (UDP). Indeed, the UDP transport protocol, unlike the TCP protocol, does not use a 3-way handshake signalling mechanism, so that the terminals can adapt the data transmission frequency to the network bandwidth conditions, for example. In particular, the QUIC protocol makes it possible, under certain conditions, to transmit useful data as soon as the first packet of a communication is sent, without the QUIC client having to wait for a reply from its correspondent. This reduces latency and signalling times between clients.

In order to support any IP address change without having to terminate an ongoing QUIC communication, the QUIC transport protocol does not rely on transport addresses, and more specifically on the quadruplet {source IP address, source port number, destination IP address, destination port number} but on a connection identifier called CID. The QUIC specification defines two types of CIDs: Destination CID and Source CID.

Currently, the QUIC protocol supports a connection migration mechanism that allows QUIC communication to be maintained in the event of a change in one of the addresses (or port numbers) of the participants (including changes related to the use of addresses allocated by Network Address Translation (NAT) intermediary equipment). The reception of a message in relation to an ongoing communication presenting a new source address is an indication of connection migration. Thus, a connection migration consists of moving from one quadruplet {source address, source port number, destination address, destination port number} to another.

However, the presence of status functions such as NAT, firewall or proxy functions on a network path used by the QUIC communication is a source of problems that can compromise the quality of the communication. Indeed, in a known manner, such status functions are generally hosted by intermediary equipment, and maintain a table comprising entries associating in particular an internal source address and an external source address for an outgoing data packet. They use this table to filter incoming packets by discarding those that do not match a valid table entry. An entry is generally held for a period of time, known as a predetermined lifetime, after which, in the absence of a new outgoing data packet or an adequate control message to extend the lifetime, it is invalidated and removed from the table. This lifetime can be short, in the order of a second.

To overcome this disadvantage, the communication protocols, including QUIC, use a "keepalive" mechanism of a communication which can, in particular, check that the link on which the communication is established is still active or prevent this link from being broken. In the case where the communication is established on a link which includes an item of intermediary equipment, the NAT type for example, such a mechanism consists for an item of terminal equipment, in sending a signalling message at a regular frequency to the remote item of terminal equipment, so that the entries in the tables maintained by said item of intermediary equipment are not deleted suddenly, at the risk of breaking the communication between the terminals while the exchange of data is not yet complete. For example, the IPsec protocol uses a message called "NAT-Keepalive" whose default sending frequency is 20-seconds.

Today, this "keepalive" mechanism, characteristic of some communication protocols including the QUIC protocol, is applied indifferently by an item of terminal equipment to all the paths available to this item of terminal equipment to access the communication network, whether or not a status function is present on the path.

However, this mechanism is costly in terms of resources, both for the network that it overloads and for the item of terminal equipment, whose computing resources it requires, and even increases energy consumption in the case of a battery-operated item of terminal equipment, such as a mobile terminal.

In this respect, the deactivation of this "keepalive" mechanism can multiply by 5 or 6 the operating time of a battery-powered item of terminal equipment, such as a mobile terminal for example. It should also be noted that reducing the frequency of "keepalive" messages contributes significantly to increasing the battery life of the item of terminal equipment. Indeed, the item of terminal equipment potentially embeds several applications, each of which sends its own "keepalive" messages. The potential gain is all the more important as sending the "keepalive" messages required per embedded application in the item of terminal equipment is more reduced.

There is therefore a need for a technique that makes it possible to avoid activating a keepalive mechanism unnecessarily or to optimize its use (for example by optimizing the frequency of sending messages relating to the activation of the keepalive mechanism), in particular when this mechanism is used to maintain the characteristic entries of a communication established on a path comprising at least one item of intermediary equipment, in a table provided for this purpose and managed by this item of intermediary equipment.

SUMMARY OF THE INVENTION

The invention responds to this need by proposing a method for managing at least one communication established on a transport protocol of an item of terminal equipment in a communication network, said item of terminal equipment being able to access said communication network via at least one IP resource, each IP resource comprising an IP address and a port number, comprising:

detecting a presence, on at least one path allowing said item of terminal equipment to be reached via said communication network on an IP address of said item of terminal equipment called second IP address of at least one status function configured to maintain in a table a status associated with a communication on said path during a predetermined lifetime, comprising the transmission in the communication network of a first message from at least a first IP resource of said item of terminal equipment, said first IP resource comprising a first IP address and a first port number to a second IP resource of said item of terminal equipment, comprising said second IP address and a second port number, and deciding on the presence of at least one status function on said at least one path according to data received by the second IP resource in response to the transmission of the first message, and triggering an action for managing a communication of the item of terminal equipment on said at least one path allowing said item of terminal equipment to be reached via said communication network on said second IP address, according to said detection.

The invention relates to the management of communications of an item of terminal equipment in a communication network comprising intermediary equipments that embed status functions, such as NATs or firewalls. These status functions only allow data packets exchanged by the items of terminal equipment via the communication to pass if they correspond to a valid entry in their status table, and such validity is only guaranteed for a determined period. As a result, managing communications of an item of terminal equipment over such a network can be complicated. To improve the situation, the invention is based on a completely new and inventive approach, which consists in discovering the presence of status functions on the paths linking together the various resources available to the item of terminal equipment for accessing the communications network and in taking into account the result of this discovery in order to decide on the communication management actions to trigger. One principle of the invention is to transmit a message from at least one first IP resource of the item of terminal equipment to a second IP resource of this item of terminal equipment, and to decide on the presence of a status function on the path linking the first and second resources according to data received by the item of terminal equipment on its second IP resource, following the transmission of the message. In other words, the invention proposes to discover the presence of possible status functions by drawing on the local IP resources of the item of terminal equipment. The detection of a status function on one of the paths allowing the item of terminal equipment to reach the second IP address is taken into account for the management of a communication involving this second IP address of the item of terminal equipment.

The invention also applies when the item of terminal equipment has only one IP address to access the network (the first and second IP resources are then characterised by identical IP addresses but different port numbers).

The invention is suitable for any type of transport protocol, in particular the QUIC protocol. According to an aspect of the invention, the presence of at least one status function on the path is decided when the received data includes an error message or when no data is received by the second IP resource in response to the transmission of the first message by at least one said first IP resource.

According to another aspect of the invention, the first message comprises a request to establish a communication between said at least one first IP resource and the second IP resource of the item of terminal equipment and a decision of no status function on the path connecting said at least one first IP resource to the second IP resource via said network is taken when the data received by the second IP resource of the item of terminal equipment comprises the first message.

One principle of the invention is to exploit the different network access resources available to the item of terminal equipment to discover the status functions present on the paths connecting these resources. In order to be able to detect the presence of a status function on a path associated with a second IP address of the item of terminal equipment, for example, new communications are established from resources comprising IP addresses of that item of terminal equipment to a resource comprising that second IP address. These new communications do not correspond to any valid entries in the tables maintained by any status functions present on the path of the exchanged messages.

According to yet another aspect, the detection step comprises the masking of routing information associated with said second IP resource and contained in said request to establish said communication, prior to its transmission.

One advantage is to emulate an item of terminal equipment with only one interface. Thus the second IP resource is not recognised as a local address of the sending item of terminal equipment and the communication request is sent via the output interface of the item of terminal equipment. Alternatively, the detection step comprises, prior to the transmission of the communication establishment request, the recording of an item of identification information of at least one item of routing equipment of the communication network associated with said at least one first IP resource.

Another option to force the transmission of the communication request on the network is source routing, that is the explicit designation of an item of router equipment of the communication network in charge of routing the data packets transmitted by the first item of terminal equipment on the path corresponding to the first IP resource.

According to another aspect of the invention, a communication being established between said at least one first IP resource of the item of terminal equipment and an IP resource of a second item of terminal equipment, said first message is transmitted via said communication to said IP resource of the second item of terminal equipment, said first message comprises at least one command for sending a response to the second IP resource and a command for inserting security information in said at least one response, and a decision of no status function on the path allowing to reach via said communication network said item of terminal equipment on the second IP resource is taken when the data received on said second IP resource of the item of terminal equipment (T1) comprises said response.

An advantage of this embodiment is that it exploits a communication already established by the item of terminal equipment from one of its network accesses, to test its other network accesses. According to yet another aspect of the invention, when the presence of at least one status function has been detected on said at least one path, the method comprises determining a time period for transmitting a keepalive message of a status of a communication established on said at least one path by said at least one status function, storing the determined period, and taking into account the determined period in deciding a management action on a communication via said path.

One advantage of knowing this period is that it is used to optimize communications management. For example, it is possible to choose the communication on the path whose status function has the highest period and activate the keepalive mechanism by configuring message sending according to the said period, to limit the power consumption of the item of terminal equipment.

According to another aspect of the invention, said determination comprises:
  establishing a communication on said path associated with the second IP address, from an IP resource comprising an IP address of the item of terminal equipment, distinct from the second, associated with a path allowing said item of terminal equipment to be reached via said network, for which no presence of status function has been detected;
  transmitting data via the established communication, at a succession of time instants, two consecutive instants of said succession of instants being separated by a time interval, said interval having a current value initialised at zero and doubled at each new data transmission, as long as the communication is not lost; and
  determining a parameter representative of said transmission time period less than said current value.

For example, the value of the parameter chosen is equal to half the current value of the time interval. An advantage of this determination is that it allows an optimal frequency of transmission of keepalive messages of a status function to be obtained in a simple manner, which preserves energy resources.

According to another aspect of the invention, the method comprises updating a status representative of a configuration of a keepalive mechanism of a status function, said status being associated with said at least one path allowing said item of terminal equipment to be reached via said communication network on an IP address of the second IP resource of the item of terminal equipment depending on said at least one decision made for said at least one path.

For example, the status is set to an "optimized" value when no status function has been detected on the path, since it is not necessary in this case to activate the keepalive mechanism of the tables, or following the determination of a lifetime associated with the detected status function. On the contrary, it is set to a value of "not optimized" otherwise, notably when a status function has been detected, to indicate that the keepalive mechanism of the tables of the status function must be activated and that its configuration must be optimized. One advantage of associating such a status with an IP resource of the item of terminal equipment is to facilitate the management of communications via the network and notably to allow the item of terminal equipment to set up communications that save resources.

According to yet another aspect of the invention, the triggered management action comprises establishing a communication via said path of the item of terminal equipment without activating a keepalive mechanism of a status associated with the communication when no status function has been detected on said path and establishing the communication via said path by activating a keepalive mechanism of said status associated with the communication when a status function has been detected on said path. Thus, with the invention, the keepalive mechanism of a status associated with a communication can be activated only when necessary, i.e. when a status function has been detected on a path involved in the communication, thus saving terminal and network resources.

According to another aspect of the invention, when establishing a communication with another item of terminal equipment from the IP address of the second IP resource of the item of terminal equipment, the management action triggered comprises transmitting, in the request for establishing said communication or during said communication, the status of said at least one path associated with said IP address and/or of the determined time period.

Thus, according to the invention, an item of terminal equipment comprises its own path table (typically identified by local IP addresses of the item of terminal equipment) and a copy of those of the other terminal equipment with which it communicates (typically identified by IP addresses of the remote item of terminal equipment). It is understood that the statuses and lifetimes associated with the paths on which the communication is established may be different. Their reciprocal knowledge allows the terminals to negotiate between themselves the best choice of path and lifetime to apply to a keepalive mechanism of the statuses maintained by the status functions possibly present on the communication path. In this way, the optimization is more effective because it is implemented by all the participants in a communication.

The invention also relates to a computer program product comprising program code instructions for implementing a method for managing at least one communication as described previously, when it is executed by a processor.

The invention also relates to a computer-readable storage medium on which is saved a computer program comprising program code instructions for implementing the steps of the management method according to the invention as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network. Alternatively, the storage medium can be an integrated circuit in which the program is embedded, the circuit being adapted to execute or to be used in the execution of the above-mentioned management method.

The invention also relates to a device for managing at least one communication of an item of terminal equipment in a communication network, said item of terminal equipment being able to access said communication network via at least one IP resource, characterised in that it is configured to:
  detect a presence, on at least one path allowing said item of terminal equipment to be reached via said communication network on an IP address of said item of terminal equipment called second IP address of at least one status function configured to maintain in a table a status associated with a communication on said path during a determined lifetime, comprising the transmission in the communication network of a first message from at least one first IP resource of said item of terminal equipment, said first IP resource comprising a first IP address and a first port number to a second IP resource of said item of terminal equipment, comprising said second IP address and a second port number, and deciding on the presence of at least one status function on said at least one path according to data received by the second IP resource in response to the transmission of the first message, and trigger an action for managing a communication of the item of terminal equipment on said at least one path allowing said item of terminal equipment to be reached via said communication network on said second IP address, according to said detection.

More generally, such a device is able to implement a method for managing at least one communication as described previously.

Advantageously, said device is integrated in an item of terminal equipment able to access a communication network from at least one IP resource, comprising an IP address and a port number. The device can also be integrated in an item of proxy equipment of a communication network, able to relay the data sent by an item of terminal equipment connected to said network.

The aforementioned corresponding item of terminal equipment, device for managing at least one communication and computer program have at least the same advantages as those provided by the management method according to the present invention.

Correlatively, the invention also relates to a method of processing a communication established on a transport protocol between a first item of terminal equipment and a second item of terminal equipment in a communication network via at least one IP resource of the first item of terminal equipment, each IP resource comprising an IP address and a port number, comprising:

receiving, from said first IP resource, a message comprising the IP address, referred to as the first IP address, and the port number, referred to as the first port number, of said first IP resource, said message comprising a command for sending a response to at least one second IP resource of the first item of terminal equipment, distinct from the first and comprising a second IP address and a second port number, and a command for inserting an item of security information in the response;

extracting from said at least one second IP resource and said item of security information from said command;

sending to said at least one second IP address and said second port number at least one response comprising said item of security information.

This response from the second item of terminal equipment to the message sent by the first item of terminal equipment is used by the method for managing at least one communication implemented by said first item of terminal equipment to detect the presence of a status function on the path associated with the second IP address. Advantageously, an acknowledgement message is transmitted to the first item of terminal equipment. The said first item of terminal equipment thus receives confirmation that the second item of terminal equipment has received its command. Therefore, if it does not receive the response including the item of security information, the first item of terminal equipment will be able to deduce the presence of a status function on the tested path.

Correlatively, the invention again relates to a method for processing a communication established on a transport protocol between a first item of terminal equipment and a second item of terminal equipment in a communication network via at least one IP resource of the first item of terminal equipment, each IP resource comprising an IP address and a port number, characterised in that it comprises:

receiving on an IP resource of the second item of terminal equipment, called destination IP resource, a message relating to a communication established or to be established from an IP resource of the first item of terminal equipment, called source IP resource, said message comprising a status representative of a configuration of a keepalive mechanism of an entry of a table maintained by a status function, said entry associating a status with a communication on a path to reach said first item of terminal equipment via said communication network on the IP address of the source IP resource for a predetermined lifetime, said status being associated with said IP address, and a time period representative of a frequency of transmission of a status keepalive message of the communication;

adjusting said status and period according to status and period values stored in memory in association with said destination IP address;

transmitting a response including the adjusted values.

Thus, with the invention, both items of terminal equipment negotiate the activation/deactivation of the "keepalive" mechanism and the optimal frequency of transmission of keepalive messages.

The invention also concerns a computer program product comprising program code instructions for implementing a method for processing a communication as described previously, when it is executed by a processor.

The invention also relates to a computer-readable storage medium on which is saved a computer program comprising program code instructions for implementing the steps of the processing method according to the invention as described above.

Such a storage medium can be any entity or device able to store the program. For example, the medium can comprise a storage means, such as a ROM, for example a CD-ROM or a microelectronic circuit ROM, or a magnetic recording means, for example a USB flash drive or a hard drive.

On the other hand, such a storage medium can be a transmissible medium such as an electrical or optical signal, that can be carried via an electrical or optical cable, by radio or by other means, so that the computer program contained therein can be executed remotely. The program according to the invention can be downloaded in particular on a network, for example the Internet network. Alternatively, the storage medium can be an integrated circuit in which the program is embedded, the circuit being adapted to execute or to be used in the execution of the above-mentioned management method.

The invention also relates to a device for processing a communication between a first item of terminal equipment and a second item of terminal equipment via a communication network over a transport protocol, characterised in that it is configured to implement an aforementioned method for processing a communication.

Advantageously, said device is integrated in an item of terminal equipment able to access a communication network from at least one IP resource, comprising an IP address and a port number.

It can also be integrated into the aforementioned item of proxy equipment. The aforementioned corresponding item of terminal equipment, device for processing at least one communication and computer program have at least the same advantages as those provided by the processing method according to the present invention.

Finally, the invention relates to an item of node equipment of a communication network capable of receiving, on at least one IP resource comprising an IP address and a port number, data from a communication between an IP resource, called source IP resource, of a first item of terminal equipment and an IP resource of a second item of terminal equipment, called destination IP resource, and of retransmitting them from said at least one IP resource. Such equipment is configured to:
- detect a presence, on at least one path allowing said item of node equipment to be reached via said communication network on an IP resource of said item of terminal equipment called second IP resource, of at least one status function configured to maintain in a table a status associated with a communication on said path for a determined lifetime, comprising the transmission in the communication network of a first message from at least one first IP resource of said item of node equipment to said second IP address of said item of terminal equipment and deciding on the presence of at least one status function on said at least one path according to data received by the second IP resource in response to the transmission of the first message;
- trigger an action for managing a communication of the item of terminal equipment on said communication network via said path according to said detection.

Thus, the invention is implemented recursively by the different node equipment involved in the path tested.

LIST OF FIGURES

Figure 2:
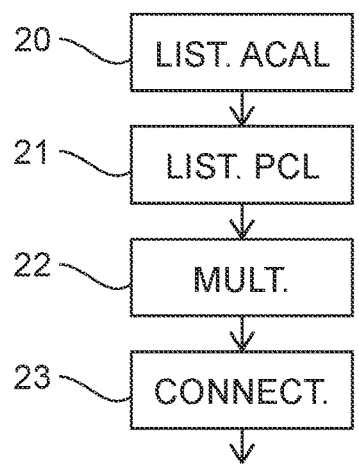
Figure 3A:
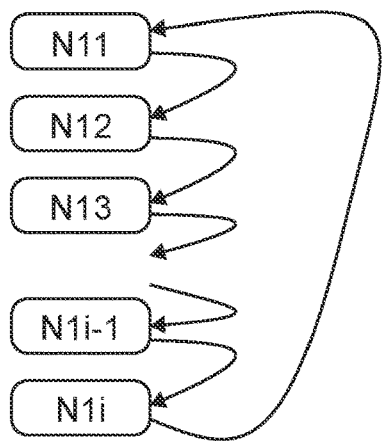
Figure 3B:
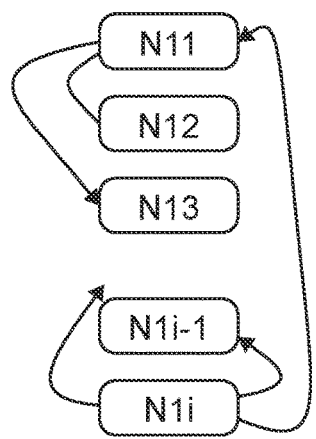
Figure 4:
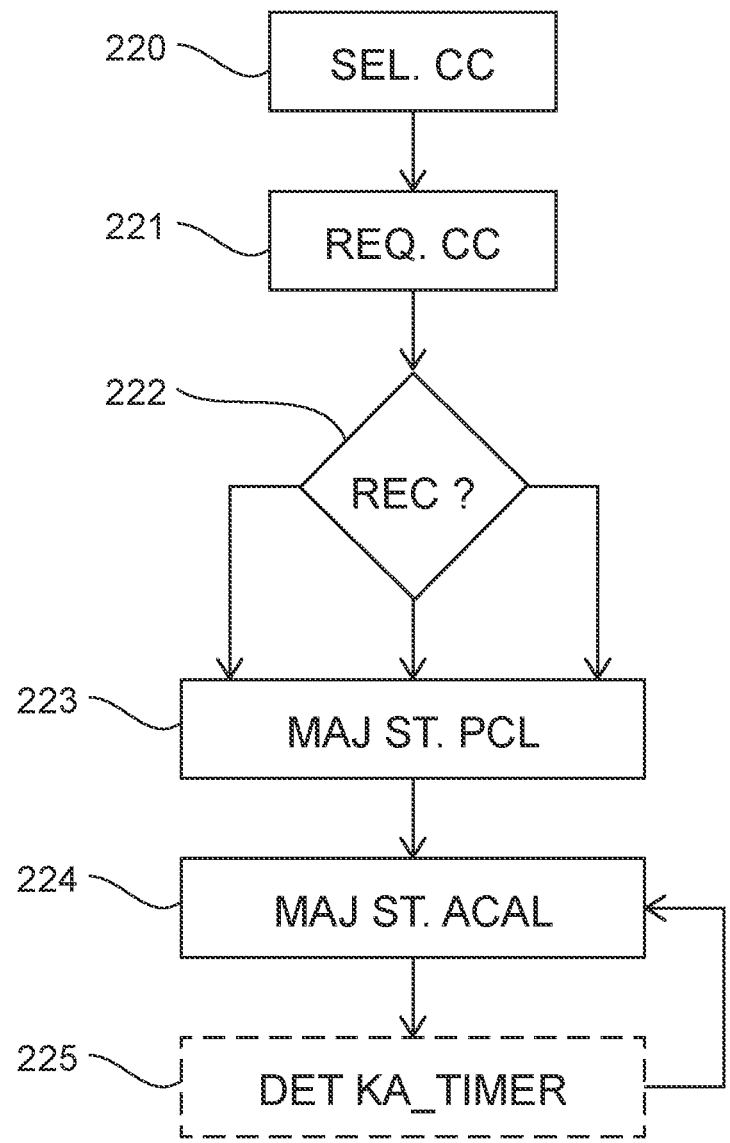
Figure 5:
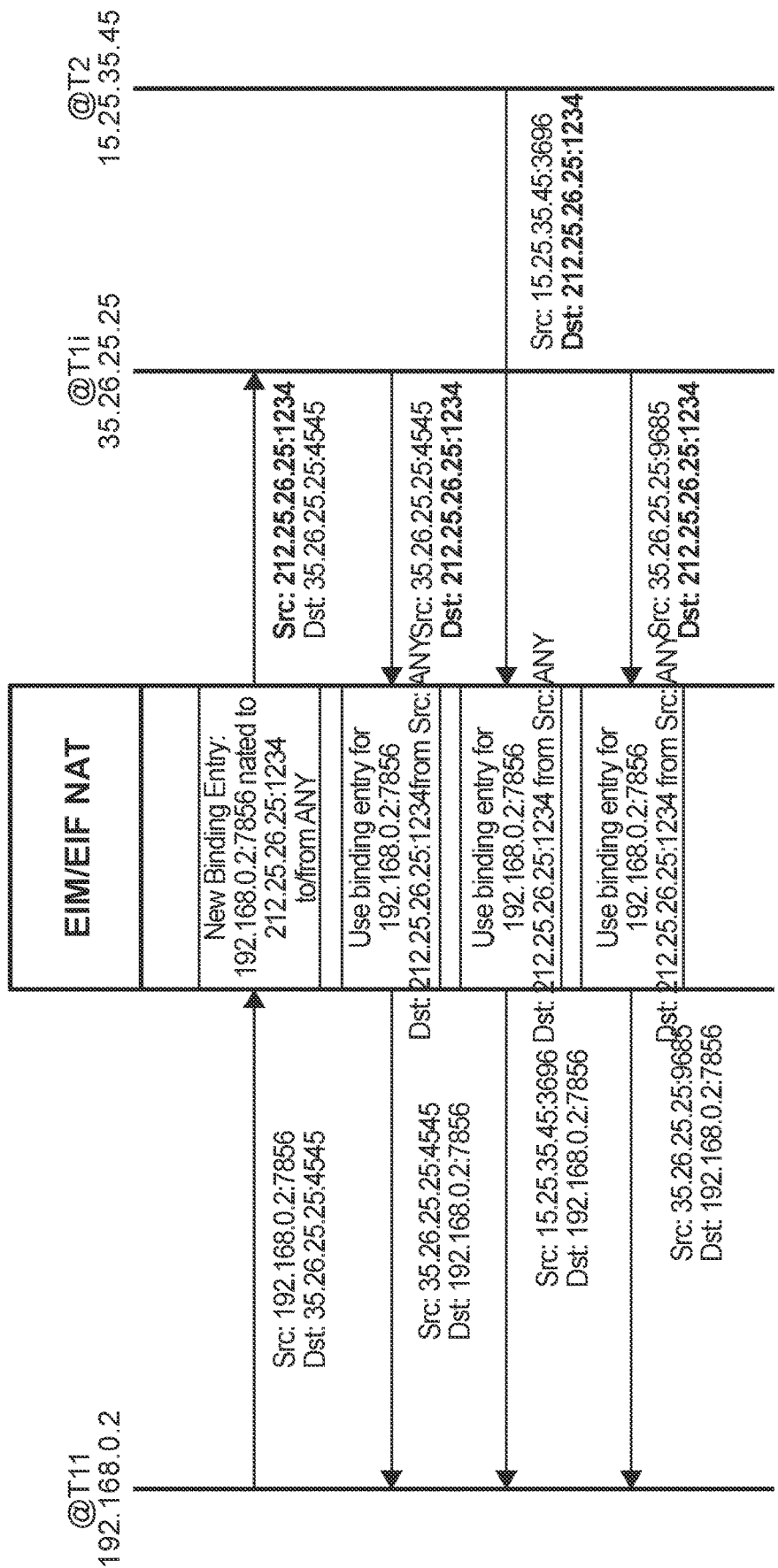
Figure 6:
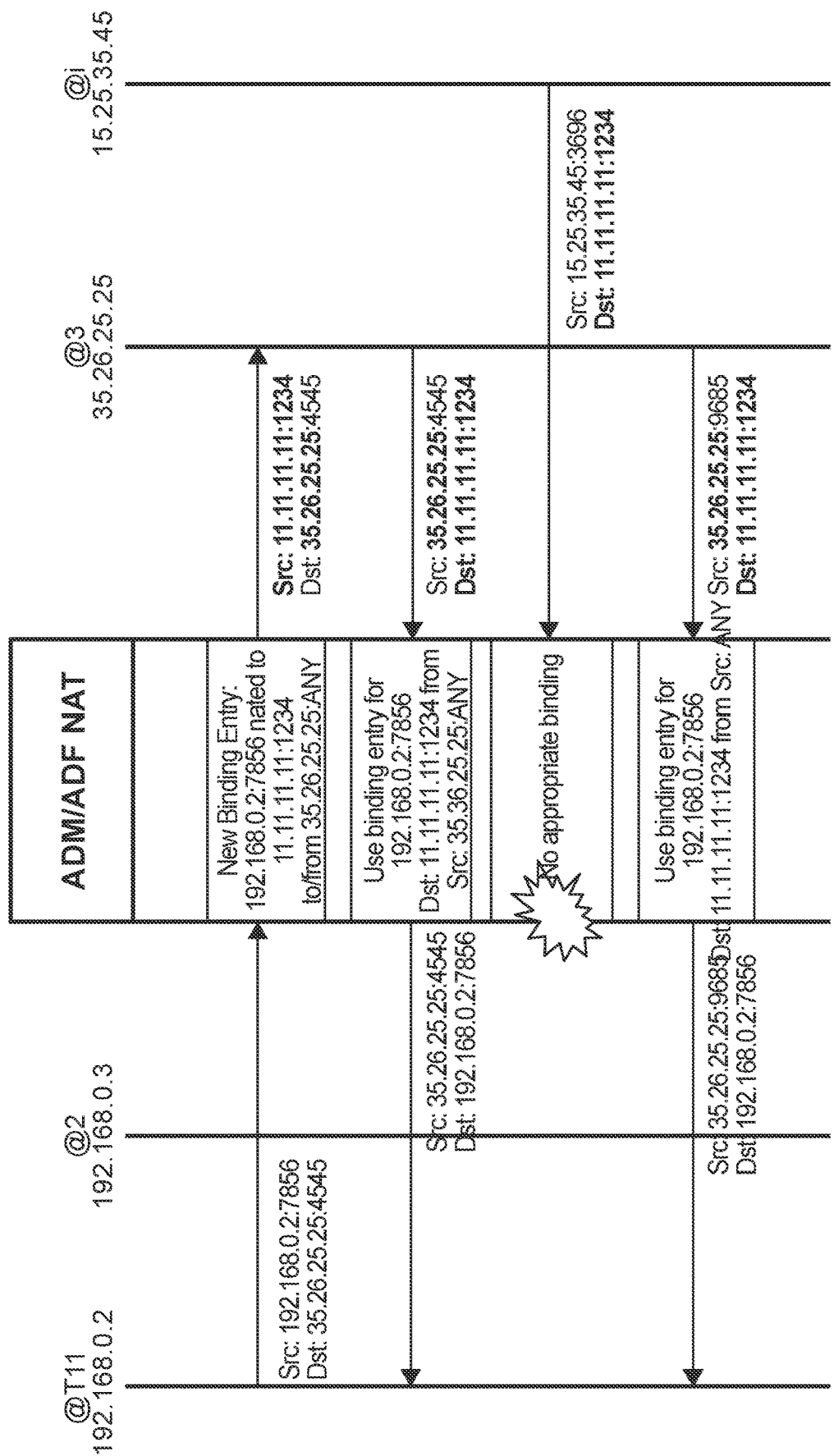
Figure 7:
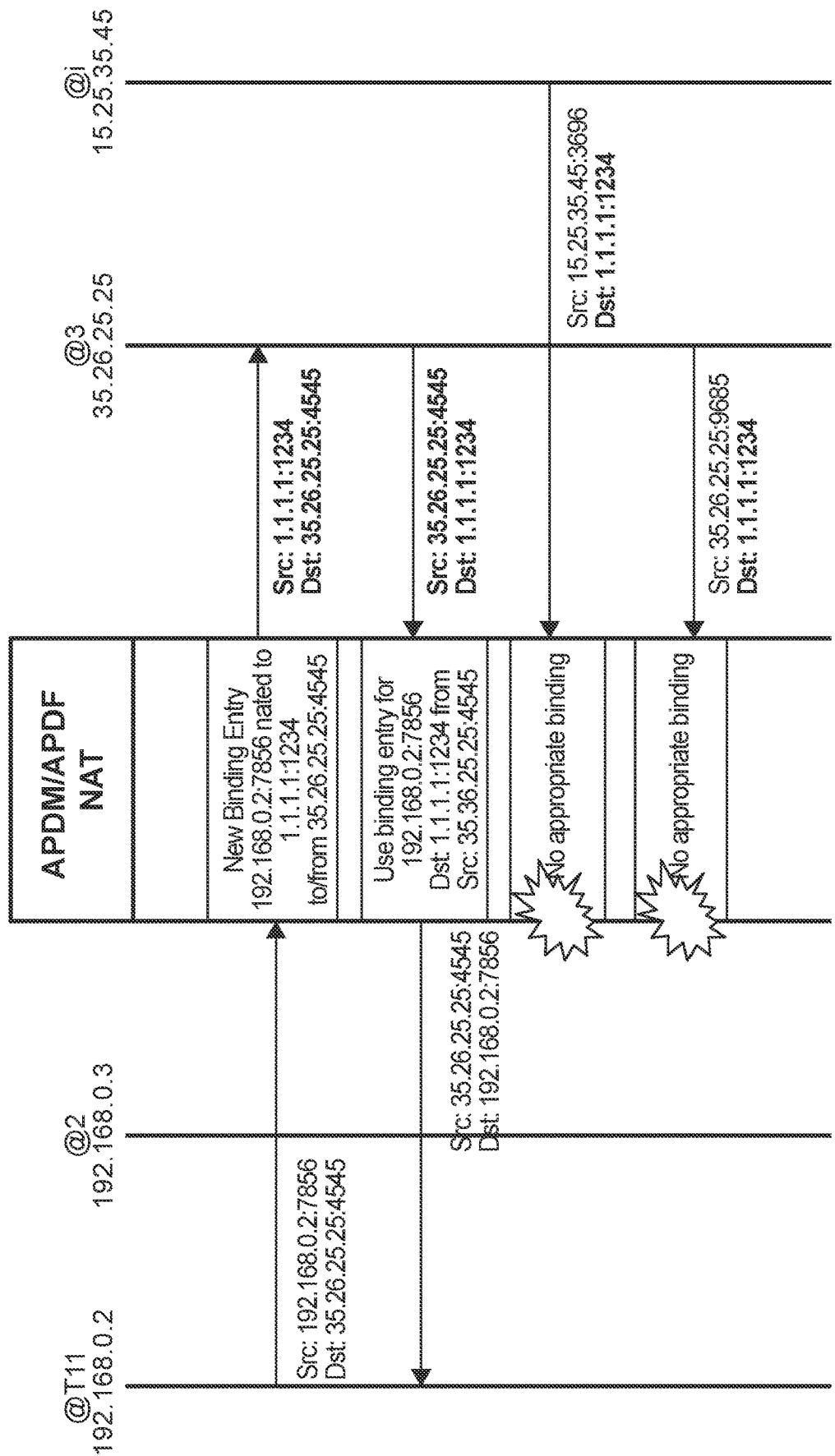
Figure 8A:
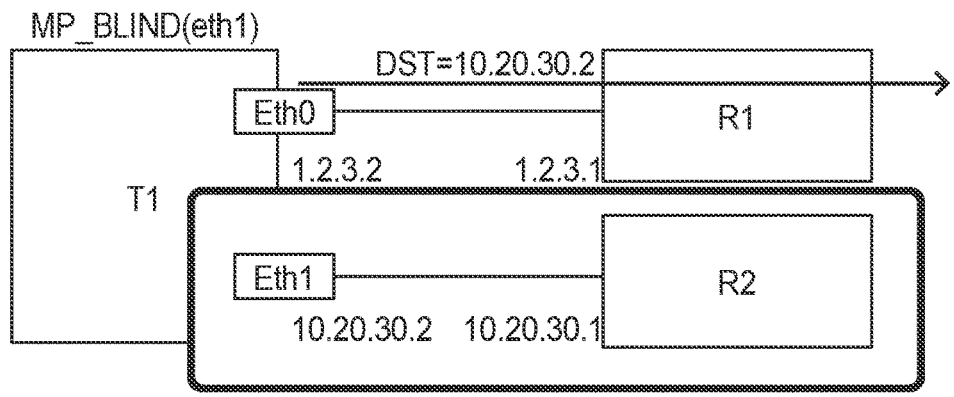
Figure 8B:
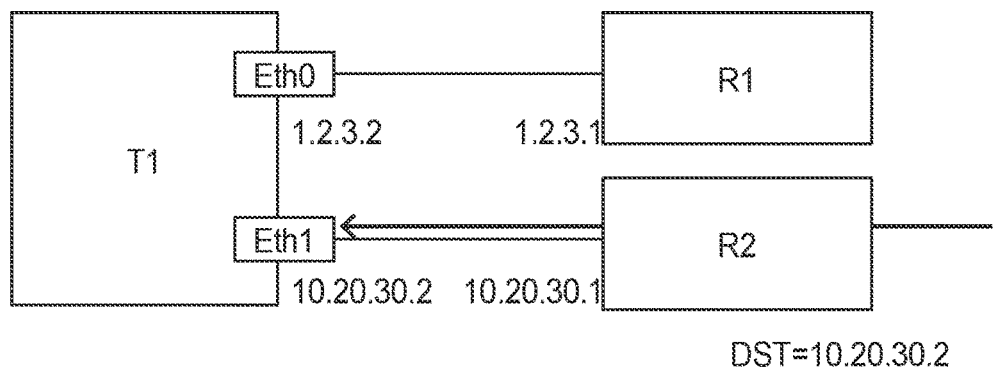
Figure 9:
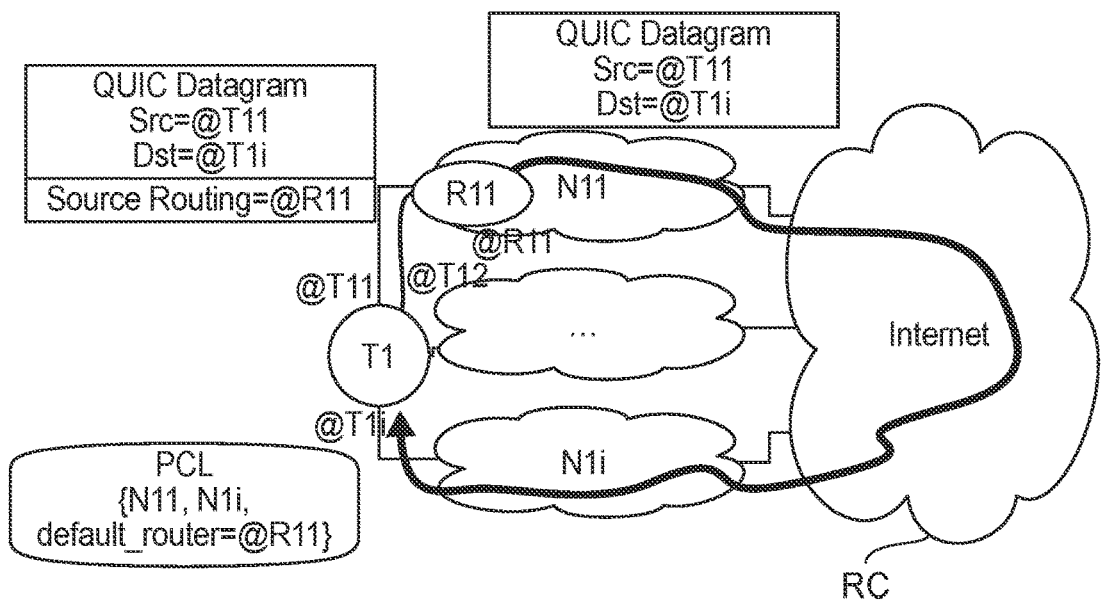
Figure 10:
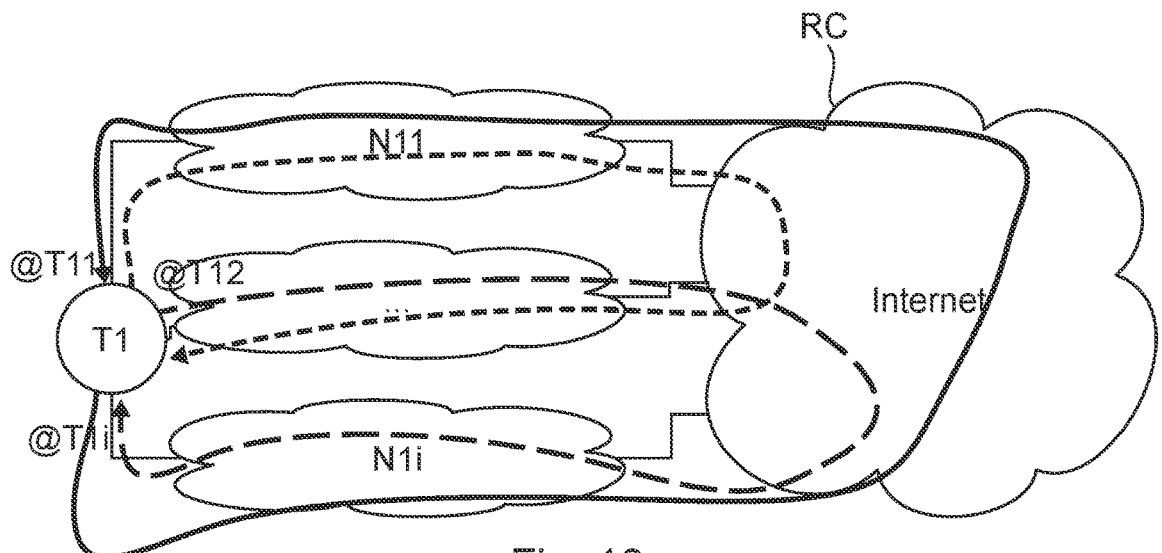
Figure 11:
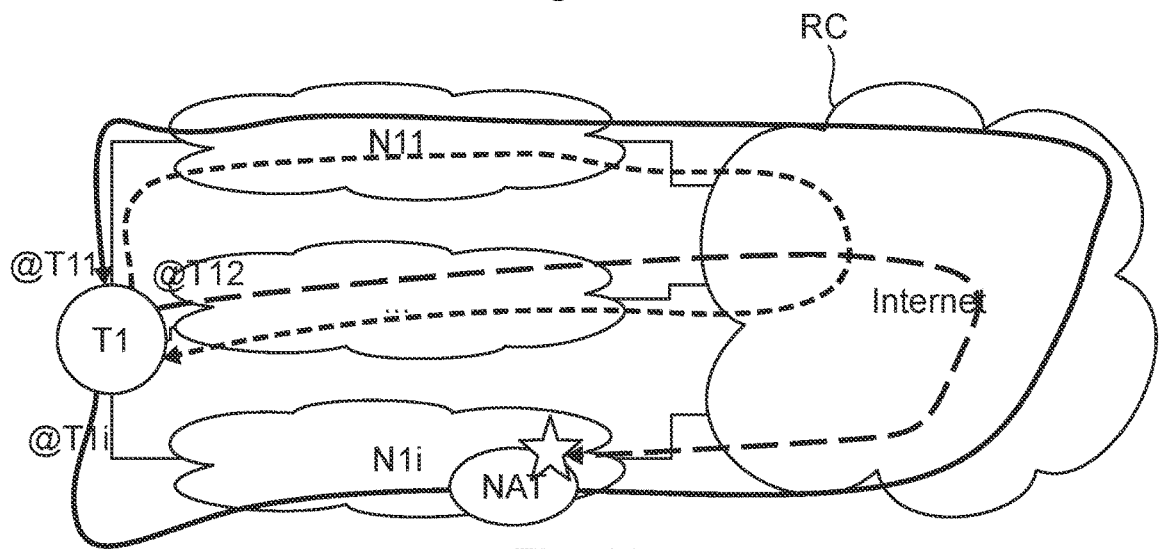
Figure 12:
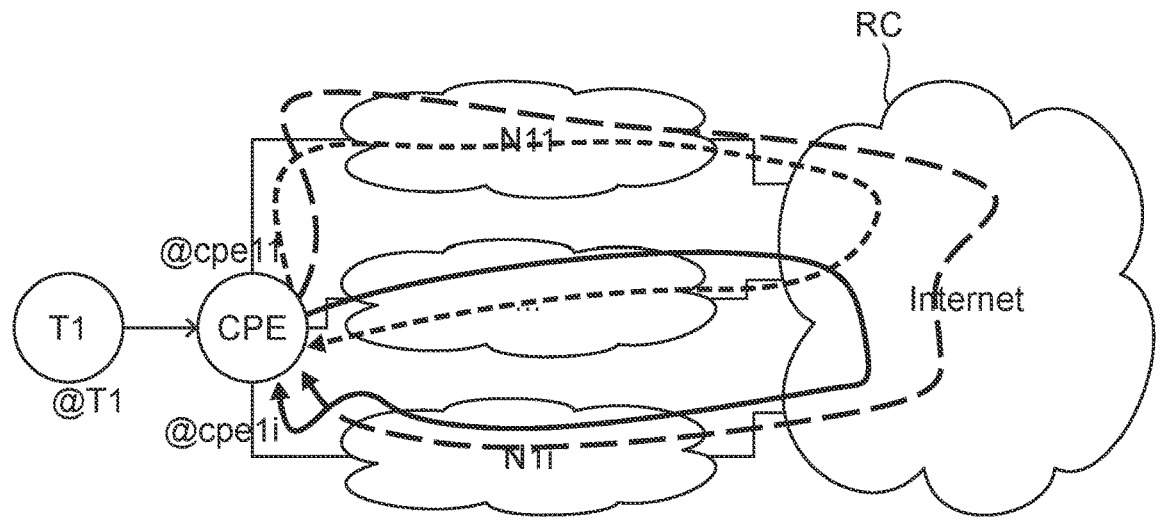
Figure 13:
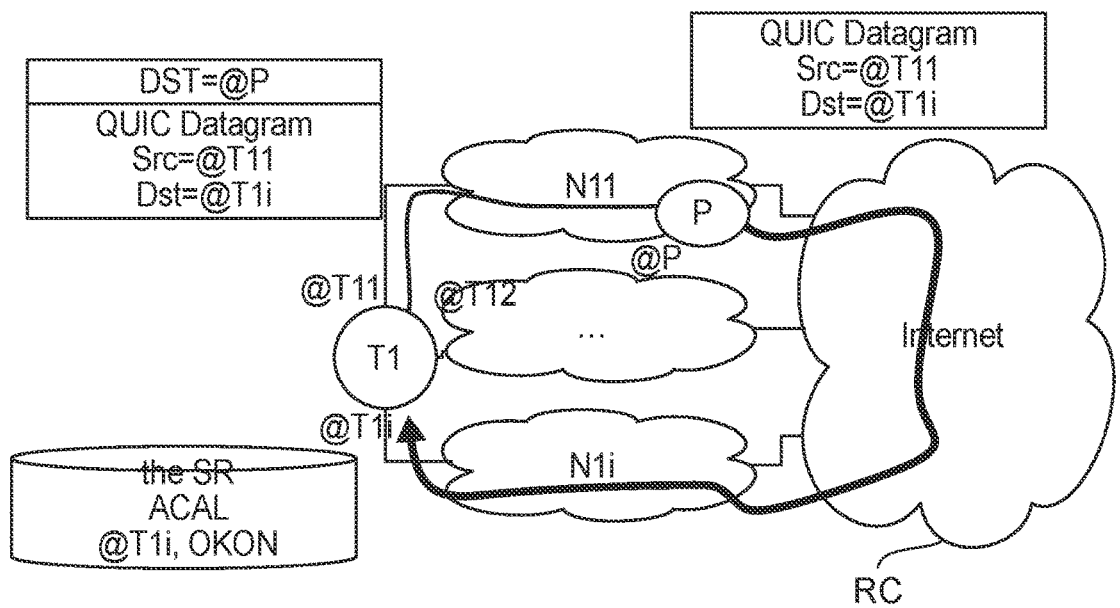
Figure 15:
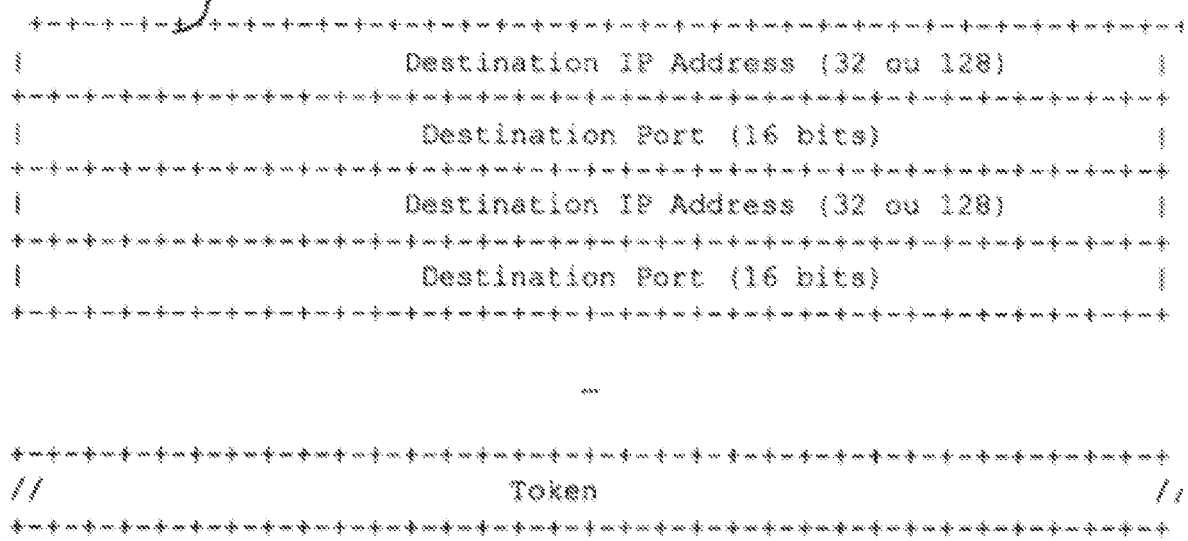
Figure 14:
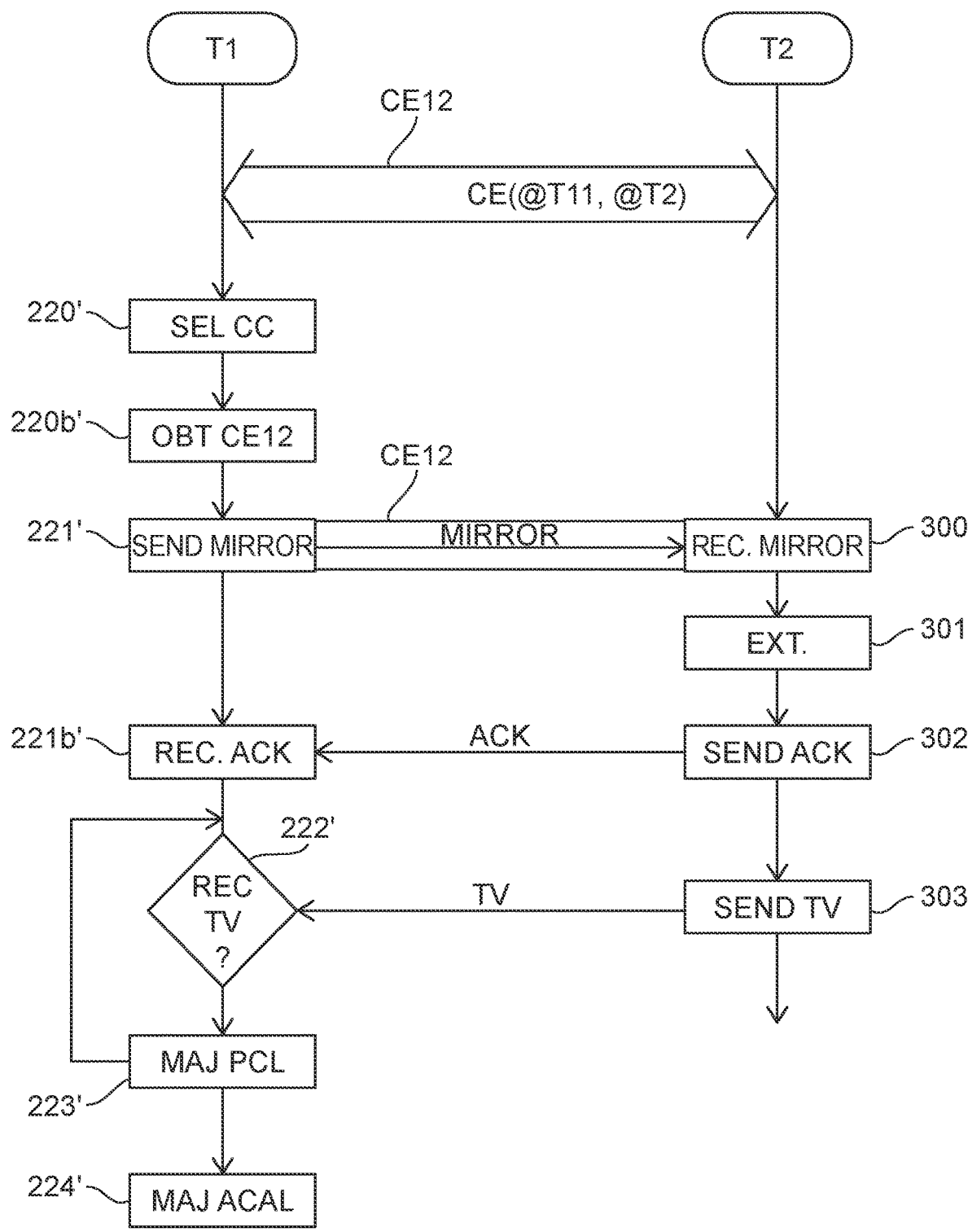
Figure 16:
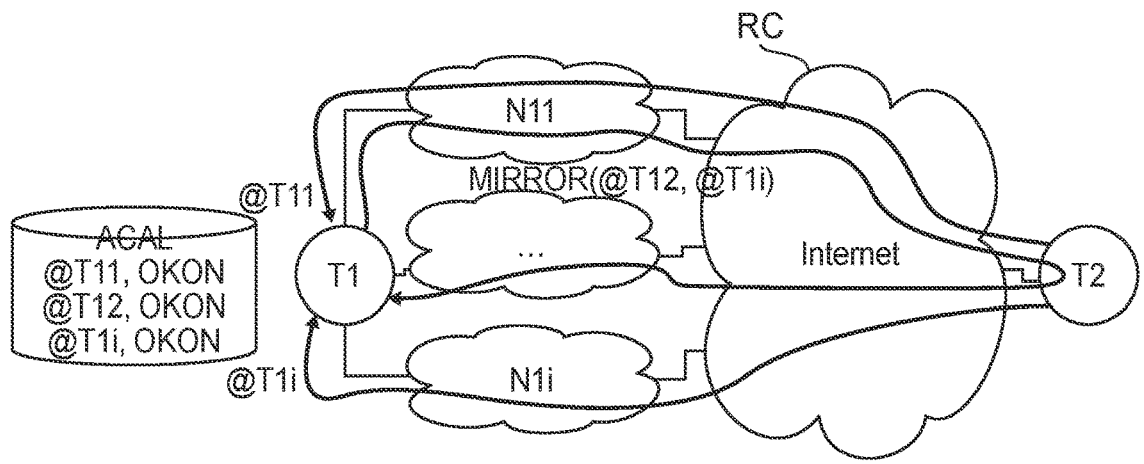
Figure 17:
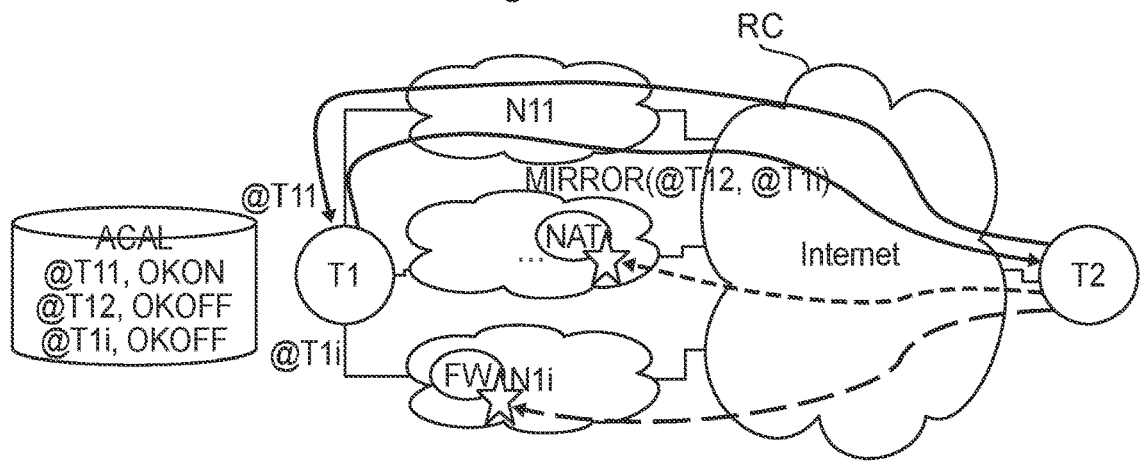
Figure 18:
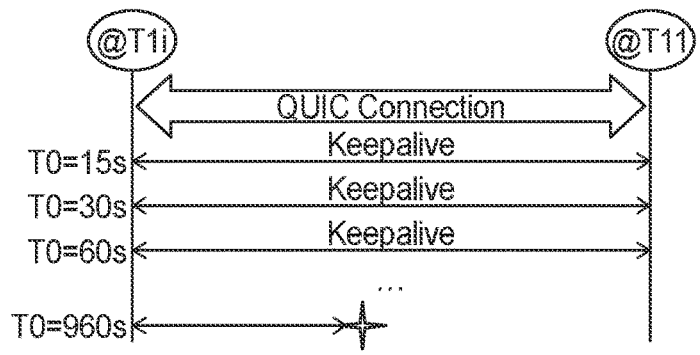
Figure 19A:
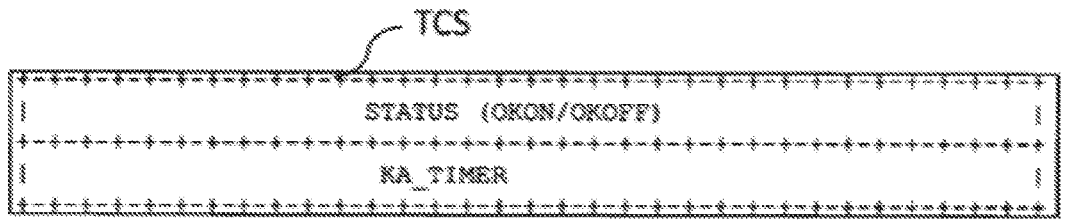
Figure 19B:
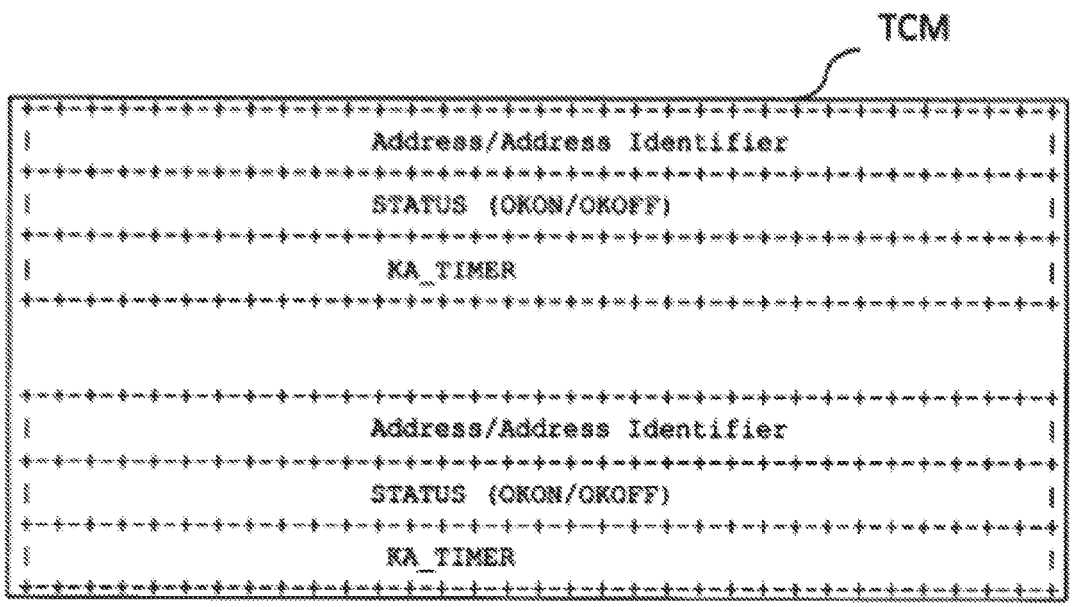
Figure 21:
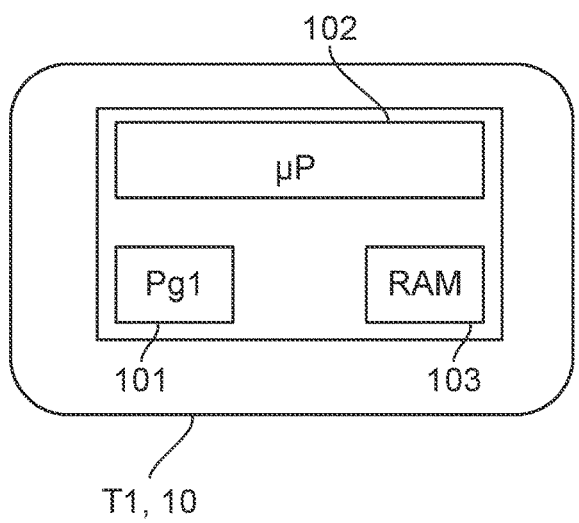
Figure 22:
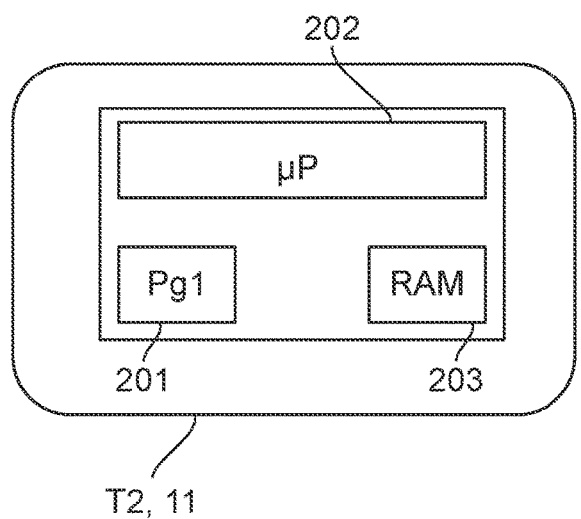
Figure 20:
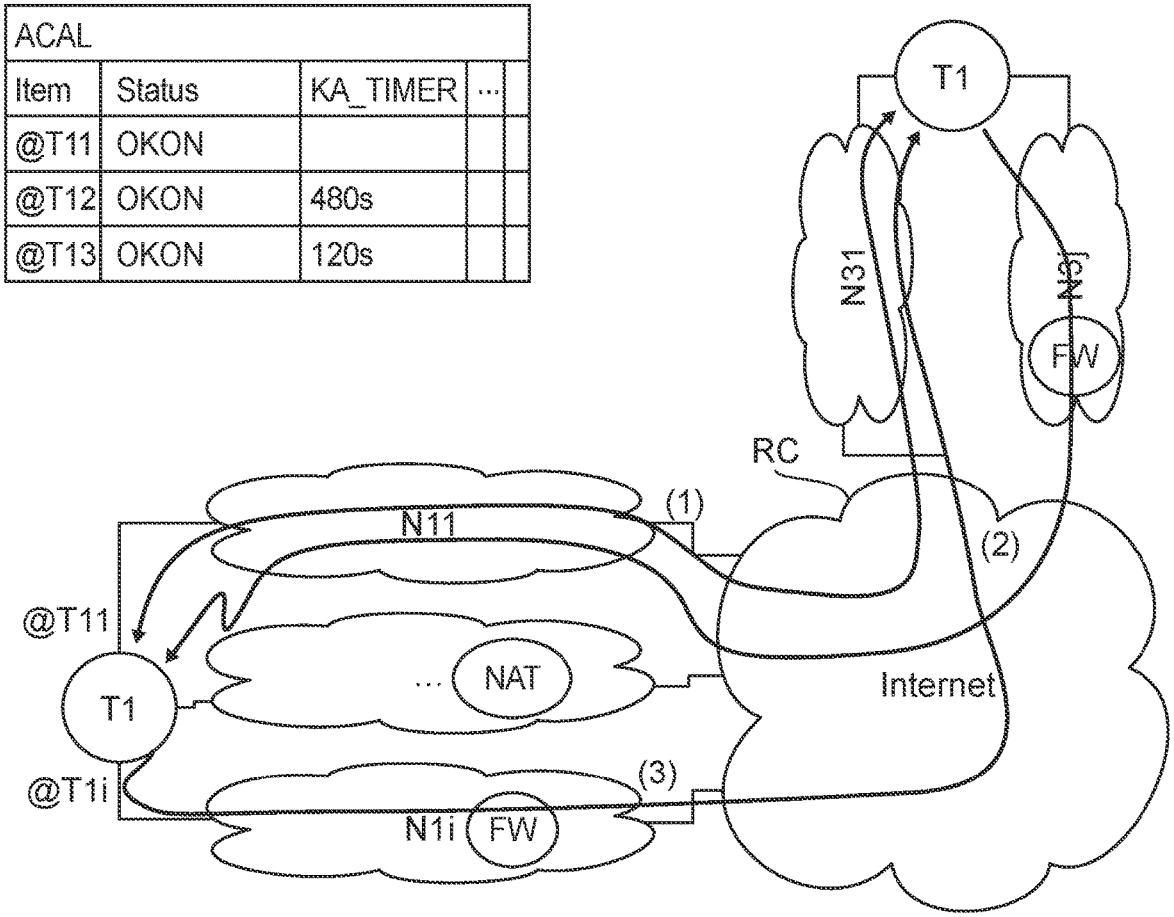

Other purposes, features and advantages of the invention will become more apparent upon reading the following description, hereby given to serve as an illustrative and non-restrictive example, in relation to the figures, among which:

FIG. 1: This figure diagrammatically shows an example of an item of terminal equipment having several paths to connect to a communication network;

FIG. 2 This figure shows in the form of a flowchart the various steps of the method for managing at least one communication of an item of terminal equipment in a communication network according to an embodiment of the invention;

FIG. 3A: This figure diagrammatically shows a first construction example of a list of candidate communications between two distinct addresses of a same item of terminal equipment;

FIG. 3B: This figure diagrammatically shows a second construction example of a list of candidate communications between two distinct addresses of the same item of terminal equipment;

FIG. 4: this figure details in the form of a flow chart, the various sub-steps of the step of discovering at least one status function on a path of the item of terminal equipment according to a first embodiment of the method for managing at least one communication according to the invention;

FIG. 5: This figure diagrammatically shows a first example of a status function present on a path of the item of terminal equipment in the communication network;

FIG. 6: This figure diagrammatically shows a second example of a status function present on a path of the item of terminal equipment in the communication network;

FIG. 7: This figure diagrammatically shows a third example of a status function present on a path of the item of terminal equipment in the communication network;

FIG. 8A: This figure diagrammatically shows a first option of the invention for forcing the sending of a communication request intended for an address of the transmitting item of terminal equipment in the communication network;

FIG. 8B: This figure diagrammatically shows the reception of the communication request at the address of the transmitting item of terminal equipment according to this first option;

FIG. 9: This figure diagrammatically shows a second option of the invention for forcing the sending of a communication request intended for an address of the transmitting item of terminal equipment in the communication network;

FIG. 10: This figure diagrammatically shows the direct communications established by an item of terminal equipment between two of its own interfaces according to a first embodiment of the invention;

FIG. 11: This figure diagrammatically shows the direct communications established by an item of terminal equipment between two of its own interfaces according to a second embodiment of the invention;

FIG. 12: This figure diagrammatically shows the direct communications established by an item of terminal equipment between two of its own interfaces according to a third embodiment of the invention, when the item of terminal equipment is connected to the network via an item of access equipment;

FIG. 13: This figure shows an embodiment of the invention when the item of terminal equipment has been configured with an item of proxy equipment located in the communication network;

FIG. 14: This figure details in the form of a flow chart, the various sub-steps of the step for discovering at least one status function on a path of the item of terminal equipment according to a second embodiment of the method for managing at least one communication according to the invention;

FIG. 15: This figure diagrammatically shows an example of the structure of a command message, known as a mirror message, sent by an item of terminal equipment to a second item of terminal equipment via a communication already established according to an embodiment of the invention;

FIG. 16: This figure diagrammatically shows a first embodiment of a detection of the presence of status functions on a path of a first item of terminal equipment using a communication already established with a second item of terminal equipment according to the second embodiment of the invention;

FIG. 17: This figure diagrammatically shows a second embodiment of a detection of the presence of status functions on a path of a first item of terminal equipment using a communication already established with a second item of terminal equipment according to the second embodiment of the invention;

FIG. 18: This figure diagrammatically shows the determination of a lifetime of an input of a status function detected on a path of an item of terminal equipment according to a third embodiment of the invention;

FIG. 19A: This figure diagrammatically shows a first example of the structure of a control message of a lifetime of a status function detected on a path of an item of terminal equipment, according to the third embodiment of the invention;

FIG. 19B: This figure diagrammatically shows a second example of the structure of a control message of a lifetime of a status function detected on a path of an item of terminal equipment, according to the third embodiment of the invention;

FIG. 20: This figure diagrammatically shows an example of the transmission of a control message by an item of terminal equipment to a second item of terminal equipment according to this third embodiment of the invention;

FIG. 21 This figure shows a synoptic diagram of a device for managing at least one communication of an item of terminal equipment in a communication network according to the invention; and FIG. 22: This figure represents a synoptic diagram of a device for processing a communication of an item of terminal equipment in a communication network according to the invention.

DETAILED DESCRIPTION OF THE EMBODIMENTS OF THE INVENTION

General Principle

The general principle of the invention is based on the discovery of status functions present on one or more paths allowing an interface of an item of terminal equipment to be reached via a communication network and on the decision to trigger a management action of a communication with another item of terminal equipment on one of these paths according to said discovery. For example, one possible action is to establish a communication by choosing a path that does not have an intermediate status function and without activating a keepalive mechanism of an entry in a table maintained by such a status function. The invention can thus manage more efficiently the communications of an item of terminal equipment via a communications network and optimize the energy resources involved in these communications.

The invention applies to any type of terminal equipment: a single-interface item of terminal equipment or a multi-interface and multi-use item of terminal equipment capable of establishing communications on multiple paths while preserving the continuity of the corresponding service(s) when the item of terminal equipment is in a mobile situation.

In the following description, item of terminal equipment (or sometimes simply "terminal") is any entity capable of establishing or accepting the establishment of a communication based on the use of one or more transport protocols, such as TCP, UDP, or QUIC. It can be a physical entity, a virtual entity, or a software application embedded in the item of terminal equipment.

"QUIC protocol", or "QUIC" for short, means any protocol that conforms to a version of the QUIC protocol specification or draft specification, such as the IETF draft specification entitled "QUIC: A UDP-Based Multiplexed and Secure Transport", or the "Quick UDP Internet Connections" protocol specification, known as the "QUIC" protocol, including existing versions of these specifications or draft specifications and their developments. More generally, QUIC is used here to denote any transport protocol that is encapsulated on top of another UDP or UDP-lite (Lightweight User Datagram Protocol) transport protocol but whose primitives and useful load are encrypted.

The invention applies to any type of item of terminal equipment, fixed or mobile, comprising one or more interfaces for communication with a communication network. These interfaces can be wired, such as an ADSL or fibre interface, or non-wired, such as a WLAN, BlueTooth, Zigbee, or other interface.

A communication network is generically defined as an Internet-type communication network that can be accessed by the item of terminal equipment via one or more access networks to that network.

The item of terminal equipment that initiates the establishment of a communication is generally referred to as the sending terminal or client, while the terminal to which the establishment request is addressed is called the remote terminal or server. A single terminal can therefore act as both client and server.

It is assumed that one or more paths of a terminal can be used to establish a communication and that a communication can be established via one or multiple paths.

Status functions, such as network address translation or NAT or firewall, can be present on all or part of the available paths that an item of terminal equipment can use to access the network, either in the access network of the sending terminal, or in that of the remote terminal, or both. NAT functions can be of different kinds, such as NAT44, NAT64, DS-Lite, NPTv6, L2NAT, NAT 66, etc. Several NAT functions can be present on a given path, such as in a "double NAT" deployment.

A network path can involve both NAT and firewall functions, with no restrictive assumptions about the number of functions present or the order in which they act.

An incoming status function is a status function located in the access network to which a destination terminal of a communication is connected. An outgoing status function denotes a status function located in the access network to which the item of terminal equipment sending the communication establishment request is connected. Thus, a status function can act as an inbound status function or an outbound status function depending on the direction of the traffic.

One or more addresses or prefixes can be allocated to an item of terminal equipment by an access network.

An IP resource designates a pair comprising an IP address and a port number.

In the following description, a more detailed description will be undertaken of the case of communications established with the QUIC protocol and in particular signalling message structures adapted to the QUIC protocol, but the invention is not limited to this example and relates more widely to any other transport protocol used by a transmitting item of terminal equipment to establish a communication with a remote item of terminal equipment via a communications network, such as the TLS (Transport Layer Security) protocol. In the examples described below, the case of a NAT status function is considered in particular, but the invention applies more generally to any type of status function.

In connection with FIG. 1, an item of terminal equipment T1 is presented, having several paths for accessing, via interfaces which allow the terminal T1 to be connected to different access networks to a communication network RC, such as the Internet: a first path C1 associated with an IP address @T11 of the item of terminal equipment T1 via an access network N11 to the network RC, a second path C2 associated with an address @T12 of the item of terminal equipment T1 via an access network N12, an $i^{th}$ path Ci associated with an address @T1$i$ of the item of terminal equipment T1 via an access network N1$i$, with i a non-zero integer.

FIG. 2 illustrates the main steps implemented by a method for managing at least one communication of the item of terminal equipment in the communication network RC.

In a step 20, it is verified, for example at the start-up of the terminal T1, whether it has several network paths C1$i$ for accessing the network RC and an ACAL list (for "Address Candidate List") of the addresses associated with these paths is obtained. Preferably, such an ACAL list comprises for an IP address @T1$i$ of the terminal T1, an entry associating at least one STATUS value with the address @T1$i$. By default, this parameter is set to OKOFF, which means that for this address, no optimization of the management of a volume of the messages sent by a keepalive mechanism of the status functions is implemented.

In 21, from the ACAL list, a list of candidate communications CC, called PCL (Path Candidate List), is constructed between two distinct resources of the item of terminal equipment T1, i.e. between a first pair (first IP address, first port number) and a second pair (second IP address, second port number). It is understood that these candidate communications are intended to connect two distinct resources of the same item of terminal equipment T1.

Optionally, the PCL list can exclude private IPv4 addresses as described in the document RFC 1918, published by the IETF in February 1996 and accessible via the following URL: https://tools.iettorehtml/rfc1918, the IANA-Reserved IPv4 Prefix for Shared Address Space addresses, as specified in the document RFC 6598 published by the IETF in April 2012 and accessible via the following URL: https://tools.ietf.org/html/rfc6598, the LLA ("Link Local Address") or ULA ("Unique Local Address") IPv6 addresses. Note that the exclusive allocation of such addresses to an end device is an indication that an address translation mechanism is implemented in the communication network to allow global connectivity.

Note also that for an element, that is the same candidate communication in the PCL list, the source and destination addresses must be of the same type or address family, e.g. IPv4 or IPv6, but that the list may contain candidate communications involving addresses of different types, for example candidate communications between two IPv4 addresses and candidate communications between two IPv6 addresses.

In 22, the presence of at least one status function is detected, on at least one path allowing the terminal T1 to be reached via the communication network RC on an IP address of said item of terminal equipment, called the second IP address. Advantageously, this step is repeated for all the paths listed in the ACAL list.

To perform this detection, candidate communications from the PCL list are used.

For example, candidate communications involving the second IP address are considered. A first message is transmitted in the communication network from at least one first IP resource of said item of terminal equipment to a second IP resource of said item of terminal equipment, comprising the second IP address and a port number. The terminal T1 then decides on the presence of at least one status function on the path taken by this communication to connect the terminal T1 to the network RC via the second IP resource according to data received on this second IP resource in response to the transmission of the first message. Advantageously, this step is repeated for all candidate communications involving the second IP address of the T1 terminal.

It is understood that the detection of the presence of a status function for one of the candidate communications is sufficient to conclude that a status function is present on the path connecting the terminal T1 to the network RC via the second IP address.

In 23, a management action of a communication of the item of terminal equipment T1 on the path allowing said item of terminal equipment to be reached via said communication network on said second IP address is triggered, according to said detection.

For example, the management actions of step 23 comprise selecting a path to establish communication with a remote terminal according to the result obtained in 22. Examples of management actions will be detailed in the remainder of the description.

Step 21, called LIST PCL, for obtaining a PCL list of candidate communications from the paths in the ACAL list is now detailed.

PCL LIST Step

The purpose of this step is to create the PCL list from the ACAL list.

If the addresses in the ACAL list are not all of the same type, e.g. if the list includes elements of different types, e.g. IPv4 addresses and IPv6 addresses, then a sub-list is created per address type: ACAL(v4) and ACAL(v6).

It is noted that the ACAL list of paths available at the T1 terminal to access the network RC may include IP addresses or prefixes, but also network interface names (e.g. eth1, wlan0), network names, etc. In the following, reference will be made to the elements of the ACAL list.

According to the invention, the PCL list comprises candidate communications CC between two elements of the ACAL list. It is created taking into account the following constraints:

Each entry in the PCL list is composed of two elements from the ACAL list;

The first element of a PCL entry is called "Source". A port number of the T1 terminal, called source port, is associated to it;

The second element of a PCL entry is called "Destination". A port number of the T1 terminal, called destination port, is associated to it;

Each element of the ACAL list must appear in at least one PCL entry as "Destination";

Two ACAL elements can only belong to one and only one PCL entry;

An element of the ACAL list can appear in several PCL entries as "Source";

Some elements of the ACAL list may not appear in any PCL entry as "Source";

The PCL list is ordered;

An entry with a source SRC1, must not precede an entry with a destination SRC1. Indeed, such a configuration would create an entry in a possible intermediate status function for the element SRC1. When testing a communication with SRC1 as a destination, this status function could let the data packet used to perform the test pass and thus hide the presence of this status function on the path associated with SRC1.

FIGS. 3A and 3B illustrate two examples of the construction of the PCL list from the ACAL list comprising the elements N11, N12, . . . , N1$i$. These two examples satisfy the constraints listed above.

The example in FIG. 3A generates the following PCL list: {N11, N12}, {N12, N13}, {N13, N14}, . . . , {N1$i$−1}, {N1$i$, N11}.

The example in FIG. 3B generates the following PCL list: {N11, N12}, {N11, N13}, {N11, N14}, . . . , {N1$i$, N1$i$−2}, {N1$i$, N1$i$−11}, {N1$a$, N11}.

In relation to FIG. 4, step 22 of detecting a presence of a status function according to a first embodiment of the invention is now detailed.

MULT1 Embodiment or "Stand-Alone" Mode

As illustrated in FIG. 4, a communication to be established is selected in 220 from the candidate communications in the PCL list. During this selection, care is taken not to choose a source IP resource that has just been used as the source or destination of a previous communication, so as to avoid an entry corresponding to this resource still being maintained as valid in a table of a status function present on the tested path.

The selected communication is established in 221 by forcing a communication establishment request between the source address, the source port number, and the destination address and the destination port number to be transmitted in the communication network, such that the request is not processed locally at the T1 terminal. Advantageously, the source port number chosen for this candidate communication is different from the ones already used to test the previously listed candidate communications. This condition is necessary to detect the presence of EIF/EIM (Endpoint Independent Filtering/Mapping) NAT functions or firewalls.

Indeed, as shown in FIG. 5, a communication from a new address @T1$i$ can be established with address @T11 even in the presence of a NAT if a communication from this address @T1$i$ has been previously established (and maintained by the NAT function) to another address @T2. Indeed, with reference to FIG. 5, it is assumed that the NAT function supports the "EIF/EIM" mode. When terminal T11 establishes a communication with a remote terminal T1$i$, the NAT function allocates an external address and an external port number (212.25.26.25:1234) to this communication and rewrites the internal source address and internal port number of the packet sent by T11 (192.168.0.2:7856) to T1$i$. Then, the NAT function stores an entry in its tables to associate the internal and external information of this communication. This entry does not contain information about T1$i$. Therefore, any incoming communication to (212.25.26.25:1234) will be routed to T11 by rewriting the destination address and port number (192.168.0.2:7856) according to the instructions in the above table. In other words, the NAT function does not check the source address and port number to process an incoming packet.

It is noted that other types of filtering are more restrictive and can be detected more easily. Examples include ADM/ADF (Address Dependent Filtering), shown in FIG. 6, or APDM/APDF (Address Port Dependent Filtering), shown in FIG. 7. Indeed, unlike the EIM/EIF mode, the NAT function configured in an ADM/ADF mode (FIG. 6) must keep the destination address of an outgoing packet in memory, in addition to the source information. Thus, only packets received with a source address present in a NAT table entry will be routed to an internal terminal. For example, if T11 establishes with a remote terminal T1$i$ (35.26.25.25:4545), the NAT function allocates an external address and an external port number (11.11.11.11:1234) and rewrites the internal source address and internal port number of the packet sent by T11 (192.168.0.2:7856) to T1$i$. Then, the NAT function stores an entry in its tables to associate the internal and external information as well as the destination address characteristic of this communication (internal source: 192.168.0.2:7856, external source: 11.11.11.11:1234, destination: 35.26.25.25). The NAT function rejects all incoming communications to 1.1.1.1:1234 if the source address of a communication is not equal to 35.26.25.25.

The example in FIG. 7 is similar to FIG. 6 except that the NAT function records, in addition to the information maintained in the status tables in the example in FIG. 6, the destination port number (4545) for the outgoing call sent from T11 (192.168.0.2:7856). The NAT function rejects all incoming calls to 1.1.1.1:1234 that do not have a source address and source port number equal to 35.26.25.25:4545.

In 222, it is verified whether the communication establishment request sent from the source address and the source port number has been received by the destination IP resource of the terminal T1. If so, it is declared at 223 that the candidate communication (@T11, PS, @T1$i$, PD) follows a path that does not include a status function and a PATH-STATUS status of the candidate communication is updated to OK.

If not, we decide that the path (@T11, PS, @T1$i$, PD) is unusable in the absence of an outgoing communication and the associated PATH_STATUS status is set to NOP.

Finally, if an error message has been received, for example of the ICMP type with an unreachable destination or protocol indication, the path taken by the selected candidate communication is declared unusable and the PATH-STATUS status of the communication is set to the value NOP.

Note that decisions to update the status of the paths taken by the candidate communications tested can be made immediately after a single setup attempt or alternatively after several attempts.

The sequence of steps 220-223 is then repeated as long as there are candidate communications to be tested.

According to a first option all the candidate communications are tested. An advantage of a systematic approach is that it allows the terminal to assess the viability of all available paths (and to decide on a traffic routing policy accordingly).

According to a second option, only a part of the communications is established according to a local policy at the terminal T1. An advantage of a selective approach is that it is less costly in terms of computational resources and potentially better adapted to particular contexts, according to which for example the choice of a path is indexed by the nature of the traffic that will transit by the communication. For example, Internet traffic is routed through a NAT while voice traffic is routed over a non-NAT path.

Advantageously, the candidate communications are selected in 220 according to their order of appearance in the PCL list and established sequentially so as to avoid the registration of entries by an NAT function on the path that is desired to be tested. However, it should be noted that multiple candidate communications may be established simultaneously provided that no IP resource of the terminal appears as both source and destination in candidate communications in the PCL list.

However, if the PCL list is constructed as follows: [(@T11,@T12), (@T12,@T13), . . . , (@T1$i$−1, @T1$i$), . . . , (@T1$i$,@T11)], then the candidate communications will necessarily be established sequentially. At 224, the status of the IP addresses associated with the paths listed in the ACAL list is updated as follows:

if all the candidate communications tested to an IP address @T1$k$, k being an integer between 1 and i, have their status set to OK, it is decided that the path associated with the address @T1$k$ of the terminal T1 does not comprise a status function and the status of this IP address is updated to a "optimized" value or "OKON"

(for "Optimized Keepalive On"), which means that, for this path, the procedure for optimizing the keepalive mechanism of the inputs maintained by the status functions is activated;

otherwise, if at least one candidate communication tested to a resource comprising the IP address @T1k has its status set to NOP, then it is decided that the path associated with the IP address @T1k of the terminal T1 comprises an intermediate status function and the status of this resource STATUS is updated to a "not optimized" value or "OKOFF" to mean that the optimization of the keepalive mechanism of the entries maintained by the status functions is not activated on this path and that it will be necessary to determine a transmission frequency of the "keepalive" messages in order to optimize the mechanism. After this additional processing step, the status can be changed to "OKON" with the optimized frequency.

The step 221 of sending a request to establish a selected candidate communication is now detailed. As previously mentioned, since the source and destination IP addresses belong to the same T1 terminal, it is necessary to force the routing of the data packet comprising said request through an output interface such that it is not processed locally by the terminal.

To do this, two options are considered:

MULT1.1 Option: MP-BLIND Filter

According to a first variant illustrated by FIGS. 8A and 8B, the communication establishment request comprises a parameter MP_BLIND(@T1D) for masking the interface corresponding to the destination IP address of the candidate communication @T1D of the terminal T1.

This MP_BLIND(Interface Alias/Address) parameter allows the terminal T1 to be used as if it had only one IP address or one output interface (Interface Alias interface identifier or Address interface address).

This new parameter proposed by the invention, when invoked to trigger the sending of a packet over the network to a given interface, has the effect of applying a filter to all the other interfaces of the terminal, which has the effect that only the information relating to the unfiltered interface is retained.

In doing so, the request to establish a communication between the addresses {@T1S, @T1D)} invoked with the MP_BLIND parameter results in the packet containing this request being sent to the default router associated with the source IP address @T1S.

Thus, the T1 terminal maintains a global routing table (table 1) which includes two routing tables associated respectively with each of its "eth0" and "eth1" interfaces.

TABLE 1 t1:~# ip rule show
   0:  from all lookup local
32764: from 1.2.3.2 lookup 2
32765: from 10.20.30.2 lookup 1
32766: from all lookup main
     32767: from all lookup default
t1:~# ip route
1.2.3.0/24 dev eth0 proto kernel scope link src 1.2.3.2
10.20.30.0/24 dev eth1 proto kernel scope link src 10.20.30.2
    default via 1.2.3.1 dev eth0

For example, suppose the terminal wants to establish a communication between the source and destination IP addresses {@T1S=1.2.3.2, @T1D=10.20.30.2}. This communication is intended to be processed locally because the destination address is that of the "eth1" interface.

In order to force the sending of the data packet containing the request to establish a communication via the communication network RC to the destination IP address @T1D corresponding to the "eth1" interface, the terminal emulates a single interface behaviour by using the MP_BLIND(eth1) parameter. The routing table invoked (table 2) is shown below. The packet is then transmitted to the routing equipment R1 as shown in FIG. 8A.

TABLE 2 t1:~# ip route show table 2
1.2.3.0/24 dev eth0 scope link
default via 1.2.3.1 dev eth0

If no status function is present on the path from terminal T1 to the network RC via the "eth1" interface, the data packet will be received by terminal T1 via the routing device R2, as shown in FIG. 8B.

MULT1.2 Option: Source Routing

According to a second variant illustrated in FIG. 9, the sending of the request to establish a communication between the source IP address @T1S and the destination IP address @T1D is forced at 221 using a source routing technique. Such a technique, known to one skilled in the art, can be implemented in various ways, such as the Segment Routing (SR) extension, the IPv4 Loose Source and Record Route (LSRR) option or any other similar source routing function.

The source routing option consists of associating additional information with each entry in the PCL candidate communication list to indicate the default router associated with its @T1S source IP address for each candidate communication. For example, the PCL list updated by the terminal T1 is: {@T11, PS11 @T12, PD12, default_router=R11}, . . . , {@T1n, PS1n, @T11, PD11, default_router=R1n}.

In the following, it is assumed for example that the SR option is used.

With this option, the decision to route the data packet comprising the selected communication establishment request is based on the content of the SR option. Thus, the terminal sends the communication establishment request to the default router as identified in the corresponding entry of the PCL table. Upon receipt of the packet, said default router removes the SR option and proceeds to transmit the data packet to the next hop in the communication network.

The packet is thus routed from near to near or discarded when no route has been found.

In relation to FIG. 10, the terminal T1 seeks to establish in 221 the candidate communications CC listed in its PCL table: {@T11, PS11, @T12, PD12}, {@T12, PS12, @T1i, PD1i} and {@T1i, PS1i, @T11, PD11}. In the example shown in FIG. 10, all of these communications are established without difficulty. The ACAL table is therefore updated to set the STATUS parameter of each path associated with a tested destination IP address to the value "OKON".

In relation to FIG. 11, terminal T1 seeks to establish the following candidate communications on its network access paths: {@T11, PS11, @T12, PD12}, {@T12, PS12, @T1i, PD1i} and {@T1i, PS1i, @T11, PD11}. In the example of FIG. 11, all these communications are successfully established except for the candidate communication {@T12, PS12, @T1i, PD1i}, because a NAT function is present on the corresponding path. The ACAL table is then updated to update the STATUS parameter of the IP addresses of the access paths to the network of terminal T1. It sets the status of all available IP addresses available in the ACAL list to "OKON" except for the @T1i address for which the STATUS parameter is kept at "OKOFF".

In relation to FIG. 12, the terminal is connected to the communication network by means of an item of access equipment of the CPE type (Customer Premises Equipment). This can be for example a residential gateway. In this case, the process just described can advantageously be implemented by this item of CPE equipment.

With reference to FIG. 13, an alternative embodiment of the method just described in relation to FIG. 4 is now described, according to which the terminal T1 has been configured to connect to the network via an item of proxy equipment P located in the communication network RC.

MULT2 Embodiment or "Proxy" Mode

According to the example of the QUIC protocol, this item of proxy equipment P implements a "QUIC proxy" function responsible for executing operations on QUIC communications transmitted by or intended for the terminal T1. No constraints are imposed by the invention as to the operations performed by such a Proxy function.

This embodiment of the invention is applicable regardless of the location of the "QUIC proxy" function in the communication network.

The "QUIC proxy" can typically be configured on the terminal by using DHCP protocol, PCO (PDP Configuration Options), etc.

The QUIC protocol communication establishment requests sent by the terminal T1 are intercepted by this "QUIC proxy" P which then relays them to their destinations. As an example, we assume that an IP-in-IP encapsulation scheme or GRE (Generic Routing Encapsulation), as described in the document RFC 2784 published by the IETF in March 2000, is used between the terminal and the QUIC proxy function.

If several "QUIC" proxy functions are present in the network, the terminal can select one or more instances of this function or use all instances to establish communications in the network.

According to the invention, the terminal T1 builds the PCL list of candidate communications in 21 from the ACAL list according to the LIST step previously described. For example, the PCL list thus constructed for terminal T1 is {@T11, PS11, @T12, PD12}, . . . , {@T1n, PS1n, @T11, PD11}.

Next, in 221, as already described in connection with FIG. 4, the terminal T1 attempts to establish a QUIC communication for each of the elements of the PCL list, but this time via at least one "QUIC proxy" function.

For example, as illustrated by the example in FIG. 13, the terminal T1 sends to the proxy P a request to establish a QUIC communication comprising the destination IP address @T1i. To do so, it encapsulates this setup request (formatted according to a QUIC frame) in an IP packet whose destination address is that of the proxy P. Upon reception of the packet by the proxy P, the latter extracts the QUIC frame. Then it attempts to route the communication establishment request to the @T1i IP address. If it has a route to the @T1i address, it sends the packet on that route. If no route was found, the proxy P responds to the terminal with an ICMP message to indicate that this IP address is not reachable.

If the proxy P receives the communication establishment request, it retransmits it to the terminal by encapsulating it in an IP packet.

The previously described steps 222 to 224 remain unchanged.

In relation to FIG. 14, the step 22 of detecting the presence of a status function according to a second embodiment of the invention is now detailed.

MULT3 Embodiment or "Assisted" Mode

It is recalled that in 21 a PCL list of candidate calls to be established on the network paths available at the item of terminal equipment T1 was constructed.

During a step 220', the terminal selects at least one candidate communication CC from the PCL list. Note that it can select several or all the candidate communications from the PCL list.

At 220b', it obtains information about a communication CE12 that it has already established via one of its network paths with a second item of terminal equipment T2 in the communication network RC. For example, this communication is established between an IP resource comprising the address @T11 allocated by the access network N11 to the terminal T1 and an IP resource comprising the address @T2 of the terminal T2.

At 221', the terminal T1 transmits a message, called "mirror frame", to the terminal T2 via the communication CE12. This frame is intended to command the T2 terminal to send a response message according to the conditions specified in the fields of the mirror frame. In the case of the QUIC protocol, this is a new QUIC frame structure proposed by the invention.

This frame comprises:
at least one destination IP address of terminal T1 to which terminal T2 must send data. Advantageously, this field includes the destination IP addresses of the candidate communications selected in 220';
at least one destination port number per destination IP address. Note that if the frame does not contain a port number, the remote terminal T2 must randomly generate a port number to be associated with each destination IP address;
an additional token to be included in the response message to be transmitted to the indicated destination address(es).

An example of a mirror frame is shown in FIG. 15.

According to the invention, the terminal T2 connected to the terminal T1 via the communication CE12 implements a method for processing a communication which comprises the following steps, illustrated by FIG. 14.

It receives, in 300, the mirror frame transmitted by T1 via the communication CE1. In 301, it extracts from this frame the destination IP addresses that it contains, possibly associated with destination port numbers, as well as the token. It is recalled that if the mirror frame does not contain a destination port number, the T2 terminal generates as many as the number of destination addresses extracted, for example randomly. In 302, the terminal T2 sends to each pair (destination IP address, destination port number) of the terminal T1 specified in the mirror frame, a frame TV called blank frame because it does not carry any application data, comprising only the token. Note that the T2 terminal does not need to establish a new QUIC communication with T1. Indeed, as previously mentioned, a QUIC communication is independent of the source and destination IP resources, but relies on a security association.

Note that with another transport protocol, which may be dependent on the source and destination IP resources, the "mirror" frame would give rise to new communications, which the T1 terminal must listen to and associate with the current presence detection test.

In 222', on receiving such a frame TV on one of its addresses, the T1 terminal verifies that it does indeed include the token, then, if necessary, triggers the updating in 223' of the status ST of the corresponding candidate communication CC in its PCL list by setting it to the value "OKON". Indeed, the fact that the frame TV was received on the path associated with the destination IP address of the T1 terminal proves that there is no status function on the path followed by the frame TV. On the contrary, for all destination IP addresses associated with mirror frames which are not received after a predetermined period, the T1 terminal triggers in 223' a setting of the status of the associated path to the value OKOFF.

At 224', once all destination addresses corresponding to the candidate communications CC in the PCL list have been tested, the T1 terminal updates the status of the corresponding paths in the ACAL list, as previously described in connection with FIG. 4.

In relation to FIGS. 16 and 17, the example of a terminal T1 is considered that uses a single communication CE12 established with a remote terminal T2 to control its different available addresses @T11, @T12, . . . @T1$i$, with i a non-zero integer. Concretely, once the communication CE12 is established with the remote terminal T2, the terminal T1 sends a mirror frame listing the addresses @T11, T12, . . . , @T1$i$ as destination IP addresses and a token CS. Upon receiving the frame, the remote terminal T2 sends an acknowledgement to T1 and then sends QUIC frames of the frame TV type including only the token CS, to each of the IP addresses @T11, @T12, etc.

In the example shown in FIG. 16, all these frames are successfully received by T1. Upon receiving a data packet including such a frame TV, the latter checks whether the packet contains the token CS given in the mirror frame. If so, T1 updates its ACAL table to indicate that all addresses have a STATUS parameter equal to "OKON".

FIG. 17 illustrates the case where the data packets comprising the frame TV sent by T2 to the address @T12 and @T1$i$ are not received by T1 despite the prior acknowledgement of T2, due to the presence of status functions on the path. At the end of a predetermined period, T1 updates the status of the records of its PCL list, then those in its ACAL list to set the STATUS parameter associated with the addresses @T12 and @T1$i$ to "OKOFF", and that associated with @T11 to "OKON".

The case where the T1 terminal detects a new path is now considered. For example, a VPN (Virtual Private Network) tunnel is established from a physical interface of the T1 terminal for which it already has a network path.

This detection triggers the implementation of the MULT step of discovering status functions on this path according to one of the embodiments just described. This new path is associated with an address @T1$i$+1.

For example, the terminal T1 solicits the terminal T2 with which it is already connected by sending it a mirror frame comprising the address @T1$i$+1 and a token CS via a communication already established with it. A destination port number different from the one used for the communication already established is indicated in the mirror frame. At the end of this step, the terminal updates the STATUS parameter of the path associated to the @T1$i$+1 address according to the result of the presence detection procedure.

Then, depending on the responses received, the T1 terminal updates the status of the elements of the PCL and ACAL lists as described above.

Finally, it can trigger, in 23 (CONNECT), communication management actions on the paths of the ACAL list, taking into account the value of the STATUS parameter assigned to these paths.

SOLO Embodiment for a Single Interface Terminal

We now consider the case of a T1 terminal having only one access interface to the communication network RC and therefore only one path associated with only one IP address. The method according to the invention is also applicable to this terminal according to one of the previously described embodiments.

For example, the terminal may implement the MULT2 embodiment or "Proxy" mode to force a message to be sent to its own IP address and a different port number than the one used to contact the proxy:

If no response is received, then it concludes that there is a status function on the path.

If on the contrary a response is received, then it concludes that there is no status function on the path.

In addition, it establishes that no address translation function is present on the path when the message sent by the proxy in response to the terminal command has been successfully routed and has not undergone a destination IP address/port number change.

It also establishes that no filtering function is present on the path from the observation that the response packet received was sent from an address different from the one used to contact the proxy.

Alternatively, the terminal T1 implements the MULT3 embodiment or "MIRROR" mode. In this case, it sends a "mirror" frame to a T2 terminal with which it is already in communication and which has several IP addresses. This frame includes a token, the IP address of the T1 terminal and a destination port number different from that used by the T1 terminal to transmit the "mirror" frame as described in relation to FIGS. 15 to 17. Upon receipt of the message, the remote terminal T2 sends a response message or frame TV to the terminal address and the destination port number indicated in the mirror frame. Upon receiving the data packet including such a frame TV, the latter checks whether the packet contains the token CS given in the mirror frame. If so, T1 concludes that there is no status function on the path and updates the STATUS of this path to "OKON".

Note that although, in theory, the MULT1 embodiment is applicable to a single-interface terminal, there is a risk that the data packets transmitted into the RC network by the T1 terminal are filtered on their return by the access network. Indeed, these packets sent with an address of this access network, once relayed by the intermediate nodes imposed by the source routing, will probably be treated as an attempt to spoof the terminal's IP address and will therefore be blocked.

The receipt of such packets is an indication that the network is not protected against spoofing attacks.

In relation to FIGS. 4 and 18, the method of managing at least one communication according to a third embodiment of the invention is now described and more particularly the case is considered where the terminal T1 has detected the presence of at least one status function on the path associated with the address @T1*i*. It therefore set the status of this path to "OKOFF" in 224.

As illustrated by FIG. 4, the management method according to this third embodiment of the invention implements an optional step 225 for determining a parameter KA_TIMER representative of a lifetime of an entry instantiated by the status function present on the path.

It is assumed that the method comprises a preliminary step (not shown) of extracting the elements of the ACAL list associated with an OKOFF status and a test step to check whether at least one path has been extracted.

As an example, we consider the case of FIG. 11, for which only the address @T1*i* is associated with the status "OKOFF" and thus extracted.

Then, as shown in FIG. 18, the terminal T1 selects another address from the ACAL list, for example @T11, whose status is equal to "OKON" on the contrary.

It establishes a communication from the extracted address @T1*i* to the other address @T11 and initialises the KA_TIMER parameter to a predetermined value T0, for example 15 seconds, as recommended in the UDP Usage Guidelines, RFC 8085, published by the IETF in March 2017.

The terminal T1 then transmits data via the established communication, at a succession of time instants, two consecutive instants of said succession of instants being separated by a time interval, initially fixed at T0 and doubled at each new data transmission, as long as the communication is not lost or cut off. In the example of FIG. 18, the communication is lost when the parameter KA_TIMER reaches the value KA_TIMER_LOSS equal to 960 s.

From the value obtained for KA_TIMER_LOSS, we derive the lifetime of an input instantiated by the status function present on the path. For example, this lifetime is evaluated as half the value of the time interval that induced the loss, i.e. KA_TIMER_LOSS/2=480 s.

Advantageously, this evaluated lifetime is used to manage more efficiently the communications from the terminal T1 to the communication network RC. In particular, it is used to configure the "keepalive" mechanism and the frequency of messages sent to maintain the entry of a communication in a status function table.

Naturally, the invention is not limited to this implementation example of the lifetime evaluation, even if it offers a good compromise between performances of a keepalive mechanism and the risk of communication cut-off.

An embodiment of the step 23 for triggering a management action of at least one communication involving a network path of the terminal T1 is now detailed in relation to FIGS. 19A, 19B and 20.

CONNECT (23) Step

It is now assumed that the ACAL table of the T1 terminal has been updated and that, in particular, it provides the value of the STATUS parameter of each address associated with each path available at the level of the T1 terminal to access the communication network RC. Advantageously, it also comprises the lifetime value KA_TIMER of a status function present on the path, if any.

If several paths are available, the T1 terminal can advantageously use the information stored in the ACAL list to select the one on which it is more efficient to establish an outgoing call. For example, the terminal T1 may select the path that does not involve a status function or alternatively, a path that includes a status function associated with the highest possible KA_TIMER lifetime. Indeed, the lifetime of an input maintained by a status function has a direct impact on the frequency of transmission of keepalive messages of a keepalive mechanism and therefore on the energy consumption of the terminal.

To establish a QUIC communication with a remote terminal T3, the terminal T1 includes in a message of the communication, such as for example the communication establishment request or any other message, a new control frame called KEEPALIVE_CONTROL of a keepalive mechanism of an entry maintained by a status function. This frame is used to transmit to the terminal T3 information for configuring the keepalive mechanism of a status function maintained input intended to be activated on one or more paths connecting the terminal T1 to the network.

Examples of the format of such a message are illustrated in FIGS. 19A and 19B. In relation to FIG. 19, we consider a simple TCS format intended to be used by a terminal which has a single network interface and in particular a single network path to access the communication network RC. It can also be used to characterise a single source address used by the T1 terminal to send a QUIC data packet.

FIG. 19B shows a second TCM format of a keepalive mechanism control message for a multi-interface terminal, that is, with multiple paths to the RC network. The frame of this control message comprises a field representative of an IP address, prefix or IP address identifier, a STATUS field and a KA_TIMER lifetime field. The values of the STATUS and KA_TIMER parameters are taken from the ACAL table of the T1 terminal. The KA_TIMER field is optional. Note that if this field is absent for an element with a STATUS equal to "OKON", it means that the keepalive procedure for the inputs of a status function can be safely disabled.

One or more KEEPALIVE_CONTROL frames can be sent to a same remote terminal. For example, one control frame is sent per available path at the T1 terminal or a single control frame includes all the information for all available paths.

As illustrated in FIG. 20, when the remote terminal T3 receives the frame, it extracts the information it contains and saves it in a table called ACAL_PEER. It is understood that this ACAL_PEER table is at least a partial copy of the one maintained by T1.

The remote terminal T3 advantageously uses the information in this table to decide on which path to establish a communication with T1.

In the example in FIG. 20, it is assumed that for the path associated with the IP address @T11, the status received by T3 is set to "OKON", but no KA-TIMER lifetime value was set in the KEEPALIVE_CONTROL frame. The absence of a lifetime value when the status is set to OKON is an indication that there is no reportable function on the path. Thus, T3 knows that it can send messages to this address of T1 without testing it first.

The remote terminal T3 shall in turn determine the value of the parameter KA_TIMER representative of a lifetime of an input instantiated by the status function present on the path between the IP address @T11 of T1 and its own paths in the access networks N31, N32, N3*j* with j a non-zero integer, as previously described in connection with FIG. 15. It then transmits them to the terminals with which it wishes to communicate via the communication network, such as the terminal T1.

The terminal T1 may also decide to add one or more new paths to a communication established with the T3 terminal according to the relative values of the STATUS and KA_TIMER parameters obtained for a new path compared to those of the paths already in use. For example, a terminal may decide to add a new path to the communication even if it does not receive data from the remote endpoint T3 via that path.

It is understood that for a communication established between T1 and T3, a path used for this communication can be associated with two distinct values of the parameter KA_TIMER: KA_TIMER (Local) and KA_TIMER(PEER). In this case, terminals must choose the smaller of the two values. In the example of FIG. 20, each terminal sends KEEPALIVE_CONTROL frames to the other. Thus, each terminal has its own ACAL table and that of the remote terminal ACAL(Peer).

For example, it is assumed that the first communication was established between T1 and T3 via the IP address @T11 of N11 and the address @T31 of N31. By consulting the ACAL(Peer) table, the terminal T3 decides to add a new path via the @T3i IP address of (N3 and the @T11 IP address of N11) to the communication. In addition, the terminal T1 decides to add the path @T1i of N1i and @T31 of N31 to the communication. Since the status of address @T11 of N11 and address @T31 of N31 is set to "OKON" with no associated lifetime value KA_TIMER, the two terminals know that no status function has been detected on these paths and decide not to activate the "keepalive" mechanism for keeping the entries of a status function alive for the path (N11, N31). On the other hand, for the other paths used by the communication, with KA_TIM ER values filled in, they activate the optimization for the other paths according to the instructions described in their ACAL tables. In particular, they configure an optimal transmission frequency of the "keepalive" messages according to the KA_TIMER lifetime entered.

Thus, the two terminals can each implement the invention just described.

Terminals can send new KEEPALIVE_CONTROL frames whenever necessary, e.g. when network parameters are changed, such as an attachment to a new access network, obtaining a new IP address, etc.

In relation to FIG. 21, the hardware structure of a device 100 for managing at least one communication of an item of terminal equipment in a communication network is now presented, said item of terminal equipment being able to access said communication network via at least two paths, one said path being associated with an IP resource, comprising at least one IP address and a port number. According to the invention, the device 100 comprises a module for detecting a presence, on at least one path allowing said item of terminal equipment to be reached via said communication network on an IP address of said item of terminal equipment called second IP address of at least one status function configured to maintain in a table a status associated with a communication on said path during a determined lifetime, comprising the transmission in the communication network of a first message from at least one first IP resource of said item of terminal equipment, said first IP resource comprising a first IP address and a first port number to a second IP resource of said item of terminal equipment, comprising said second IP address and a second port number, and deciding on the presence of at least one status function on said at least one path according to data received by the second IP resource in response to the transmission of the first message, and a module for triggering an action for managing a communication of the item of terminal equipment on said at least one path allowing said item of terminal equipment to be reached via said communication network on said second IP address, according to said detection. Advantageously, the device 100 comprises a module for obtaining a list of paths connecting the terminal to the network via an IP address of this terminal, said second IP address, and a module for obtaining a list of candidate communications between a first resource comprising a first IP address and a first port number and a second IP resource comprising the second IP address and a second port number.

Advantageously, the device 100 also comprises a module for determining the lifetime associated with a status of a communication established on said path by said at least one status function detected on the path.

Advantageously, the device 100 further comprises a module for updating a status representative of the presence or absence of a status function on said path as a function of the decision, if any, of the lifetime associated with a status of the communication by the detected status function and the module for triggering a management action is configured to trigger said action as a function of the status and/or the associated lifetime.

The term "module" can correspond to a software component as well as to a hardware component or a set of hardware and software components, a software component itself corresponding to one or more computer programs or subprograms, or more generally, to any element of a program capable of implementing a function or set of functions.

More generally, such a communication management device 100 comprises a volatile memory 103 (for example, a RAM memory), a processing unit 102 equipped for example with a processor and controlled by a computer program Pg1, representative of the module for detecting a presence of a status function on said at least one path and of the module for triggering at least one management action on said at least one path and optionally modules for obtaining the list of paths, obtaining the list of candidate communications, updating a status and determining a lifetime, stored in a read-only memory 101 (a ROM memory or hard disk, for example). At initialisation, the code instructions of the computer program are for example loaded into a volatile memory 103 before being executed by the processor of the processing unit 102. The volatile memory 103 contains, among other things, the ACAL path table, the list of PCL candidate communications, and stores for each path the status parameters and, if applicable, associated KA_TIMER lifetime parameters. The processor of the processing unit 102 controls obtaining the list of paths, the detection of the presence of status functions on the listed paths and the triggering of communication management actions on the listed paths, according to the flowchart of FIG. 2. Advantageously, it also stores the ACAL-PEER path tables transmitted by other terminals.

FIG. 21 only shows a particular one of several possible ways of realising the device for managing a communication 100, so that it executes the steps of the method for managing a communication of an item of terminal equipment as detailed above, in relation to FIG. 2 in its various embodiments. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device 100 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a device for managing a communication 100 integrated in an item of terminal equipment T1 10, such as for example a mobile phone of the smartphone type, a PC type computer or a tablet, but it may also, as described in relation to FIG. 12, be embedded in any CPE type equipment with access to a communication network, such as a residential gateway, provided that it has access to a wide area network, such as the Internet for example.

Finally, we present, in relation to FIG. 22, the hardware structure of a device 200 for processing a communication established between a first item of terminal equipment and a second item of terminal equipment via a communication network, comprising at least one module for receiving, from a first IP resource of a first item of terminal equipment, a message comprising at least one command for sending a response to at least one second IP resource of the first item of terminal equipment, distinct from the first, and for inserting an item of security information in the response, a module for extracting from said at least one second IP resource and said item of security information and a module for transmitting to said at least one second address a response or frame TV comprising said item of security information.

Advantageously, the device 200 further comprises a module for storing an ACAL_PEER path table received from the first item of terminal equipment.

The term "module" can correspond to a software component as well as to a hardware component or a set of hardware and software components, a software component itself corresponding to one or more computer programs or subprograms, or more generally, to any element of a program capable of implementing a function or set of functions.

More generally, such an item of device equipment 200 comprises a volatile memory 203 (for example, a RAM memory), a processing unit 202 equipped for example with a processor and controlled by a computer program Pg2, representative of the reception, extraction and transmission modules, stored in a read-only memory 201 (for example, a ROM memory or hard disk). At initialisation, the code instructions of the computer program are for example loaded into a volatile memory 203 before being executed by the processor of the processing unit 32. The volatile memory 203 notably contains the second IP resources and the item of security information extracted from the command message received from the first item of terminal equipment. It can also include the ACAL_PEER path table(s) transmitted by the first item of terminal equipment and possibly other terminals. The processor of the processing unit 202 controls the reception of the message, the extraction of at least one second IP resource of the first item of terminal equipment and of an item of security information included in said message, the transmission of a response message including the item of security information to said at least one second IP resource of the first item of terminal equipment, according to the flowchart of FIG. 14.

FIG. 22 only shows a particular one of several possible ways of realising the processing device 200, so that it executes the steps of the method for processing a communication as detailed above, in relation to FIG. 14. Indeed, these steps may be implemented indifferently on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the device for processing a communication 200 is realised with a reprogrammable computing machine, the corresponding program (i.e. the sequence of instructions) can be stored in a removable (such as, for example, a floppy disk, CD-ROM or DVD-ROM) or non-removable storage medium, this storage medium being partially or totally readable by a computer or a processor.

The various embodiments have been described above in relation to a device for processing a communication 200 integrated in an item of terminal equipment T2 T1, such as for example a mobile phone of the smartphone type, a PC type computer or a tablet, but it may also, as described in relation to FIG. 12, be embedded in any CPE type equipment with access to a communication network, such as a residential gateway, provided that it has access to a network.

The invention just described proposes to detect the presence of status functions dynamically in a communication network on access paths of a terminal to this network. This presence detection is used to manage communications accordingly and thus improve their quality while optimizing the energy resources used by the item of terminal equipment.

In particular, the invention can be used for:
 optimizing the consumption of mobile terminal batteries;
 optimizing the selection of paths/addresses for communication establishment;
 optimizing the routing of traffic in the network;
 facilitating the establishment of new communications from an address of a remote terminal even if no data has yet been received from that address;
avoiding communication establishment problems related to the presence of status functions, such as NAT or firewall functions;
 optimizing the value of the keepalive message transmission frequency per communication, taking into account the possible presence of status functions on a path taken by the call.

The invention claimed is:

1. A method for managing at least one communication according to a transport protocol of an item of terminal equipment in a communication network, said item of terminal equipment being able to access said communication network via at least one IP resource, each IP resource comprising an IP address and a port number, wherein the method comprises:
 transmitting in the communication network, by said item of terminal equipment, a first message from at least one first IP resource of said item of terminal equipment to a second IP resource of said item of terminal equipment, said first IP resource comprising a first IP address and a first port number and said second IP resource comprising a second IP address and a second port number,
 deciding, by a management device, on a presence of at least one status function configured to maintain in a table a status associated with a communication on at least one path during a predetermined lifetime, said at least one path allowing said item of terminal equipment to be reached via said communication network on said second IP address of said item of terminal equipment, wherein deciding on a presence is performed according to data received by the second IP resource in response to the transmission of the first message, and
 triggering, by the management device, an action for managing a communication of the item of terminal equipment on said at least one path allowing said item of terminal equipment to be reached via said communication network on said second IP address, according to said decision.

2. The method for managing a communication according to claim 1, wherein the first message comprises a request to establish a communication between said at least one first IP resource and the second IP resource of the item of terminal equipment and in that a decision of no status function on the path connecting said at least one first IP resource to the second IP resource via said network is taken when the data received by the second IP resource of the item of terminal equipment comprises the first message.

3. The method for managing a communication according to claim 2, wherein the method comprises masking routing information associated with said second IP resource and contained in said request to establish said communication, prior to its transmission.

4. The method for managing a communication according to claim 2, wherein the method comprises, prior to the transmission of the communication establishment request, recording an item of identification information of at least one item of routing equipment of the communication network associated with said at least one first IP resource.

5. The method for managing a communication according to claim 1, wherein the method comprises, when the managing devices decides that the at least one status function is present on said at least one path, determining a period of time for transmitting a keepalive message of a status of a communication established on said at least one path by said at least one status function, storing the determined period, and taking into account the determined period in deciding a management action on a communication via said path.

6. The method for managing a communication according to claim 5, wherein said determination comprises:
   establishing a communication on said path associated with the second IP address, from an IP resource comprising an IP address of the item of terminal equipment, distinct from the second, associated with a path allowing said item of terminal equipment to be reached via said network, for which the management device has decided that the at least one status function is not present;
   transmitting data via the established communication, at a succession of time instants, two consecutive instants of said succession of instants being separated by a time interval, said interval having a current value initialised at zero and doubled at each new data transmission, as long as the communication is not lost; and
   updating a parameter representative of said period, by allocating it a value equal to half the current value of the time interval.

7. The method for managing a communication according to claim 5, wherein, when establishing a communication with another item of terminal equipment from the IP address of the second IP resource of the item of terminal equipment, the management action triggered comprises transmitting, in the request for establishing said communication or during said communication, the status of said at least one path associated with said IP address and/or of the determined time period.

8. The method for managing a communication according to claim 1, wherein a presence of at least one status function on the path is decided when the received data includes an error message or when no data is received by the second IP resource in response to the transmission of the first message by at least one said first IP resource.

9. The method for managing at least one communication according to claim 1, wherein, a communication being established between said at least one first IP resource of the item of terminal equipment and an IP resource of a second item of terminal equipment, said first message is transmitted via said communication to said IP resource of the second item of terminal equipment, said first message comprises at least one command for sending a response to the second IP resource and a command for inserting an item of security information in said at least one response, and wherein a decision of no status function on the path allowing to reach via said communication network said item of terminal equipment on the second IP resource is taken when the data received on said second IP resource of the item of terminal equipment comprises said response.

10. The method for managing a communication according to claim 1, wherein the method comprises updating a status representative of a configuration of a keepalive mechanism of a status function, said status being associated with said at least one path allowing said item of terminal equipment to be reached via said communication network on the second IP address of the item of terminal equipment depending on said at least one decision made for said at least one path.

11. The method for managing a communication according to claim 1, wherein the triggered management action comprises establishing a communication via said path of the item of terminal equipment without activating a keepalive mechanism of a status associated with the communication when the management device has decided that no status function is present on said path and establishing the communication via said path by activating a keepalive mechanism of said status associated with the communication when the management device has decided that a status function is present on said path.

12. The method for managing a communication according to claim 1, wherein the method comprises:
   after performing the detecting and the triggering, establishing the communication according to the transport protocol between the item of terminal equipment and a remote terminal.

13. A device for managing at least one communication of an item of terminal equipment in a communication network, said item of terminal equipment being able to access said communication network via at least one IP resource, wherein the device comprises:
   a processor; and
   a non-transitory computer-readable medium comprising instructions stored thereon, which when executed by the processor configure the device for managing to:
   transmit in the communication network a first message from at least one first IP resource of said item of terminal equipment to a second IP resource of said item of terminal equipment, said first IP resource comprising a first IP address and a first port number and said second IP resource comprising a second IP address and a second port number,
   deciding on a presence of at least one status function configured to maintain in a table a status associated with a communication on at least one path during a predetermined lifetime, said at least one path allowing said item of terminal equipment to be reached via said communication network on said second IP address of said item of terminal equipment, wherein deciding on a presence is performed according to data received by the second IP resource in response to the transmission of the first message, and trigger an action for managing a communication of the item of terminal equipment on said at least one path allowing said item of terminal equipment to be reached via said communication network on said second IP address, according to said decision.

14. The device according to claim 13, wherein the device is implemented in the item of terminal equipment.

15. The device according to claim 13, wherein the device is implemented in an item of proxy equipment of the communication network, capable of connecting the item of terminal equipment to the said network.

16. A method for processing a communication established according to a transport protocol between a first item of terminal equipment and a second item of terminal equipment in a communication network via at least one IP resource of the first item of terminal equipment, each IP resource comprising an IP address and a port number, wherein the method is implemented by a processing device and comprises:
receiving, from said first IP resource, a message comprising a first IP address and a first port number said first IP resource, said message comprising a command for sending a response to at least one second IP resource of the first item of terminal equipment, distinct from the first and comprising a second IP address and a second port number, and a command for inserting security information in the response;
extracting said at least one second IP resource and said security information from said command; and
sending to said at least one second IP address and said second port number at least one response comprising said item of security information.

17. A method for processing a communication established according to a transport protocol between a first item of terminal equipment and a second item of terminal equipment in a communication network via at least one IP resource of the first item of terminal equipment, each IP resource comprising an IP address and a port number, wherein the method is implemented by a processing device and comprises:
receiving on an IP resource of the second item of terminal equipment, called destination IP resource, a message relating to a communication established or to be established from an IP resource of the first item of terminal equipment, called source IP resource, said message comprising a status representative of a configuration of a keepalive mechanism of an entry of a table maintained by a status function, said entry associating a status with a communication on a path allowing said first item of terminal equipment to be reached via said communication network on the IP address of the source IP resource for a predetermined lifetime, said status being associated with said IP address, and a time period representative of a frequency of transmission of a status keepalive message of the communication;
adjusting said status and period according to status and period values stored in memory in association with said destination IP address; and
transmitting a response including the adjusted values.

18. A device for processing a communication according to a transport protocol between a first item of terminal equipment and a second item of terminal equipment in a communication network via at least one IP resource of the first item of terminal equipment, each IP resource comprising an IP address and a port number, said device comprising:
a processor; and
a non-transitory computer-readable medium comprising instructions stored thereon, which when executed by the processor configure the device for processing to:
receive, from said first IP resource, a message comprising a first IP address, and a first port number, of said first IP resource, said message comprising a command for sending a response to at least one second IP resource of the first item of terminal equipment, distinct from the first and comprising a second IP address and a second port number, and a command for inserting security information in the response;
extract said at least one second IP resource and said security information from said command; and
send to said at least one second IP address and said second port number at least one response comprising said item of security information.

19. An item of node equipment of a communication network capable of receiving, on at least one IP resource comprising an IP address and a port number, data from a communication between an IP resource, called source IP resource, of a first item of terminal equipment and an IP resource of a second item of terminal equipment, called destination IP resource, and of retransmitting them from said at least one IP resource, wherein the item of node equipment comprises:
a processor; and
a non-transitory computer-readable medium comprising instructions stored thereon, which when executed by the processor configure the item of terminal equipment to:
transmit in the communication network a first message from at least one first IP resource of said item of terminal equipment to a second IP resource of said item of terminal equipment, said first IP resource comprising a first IP address and a first port number and said second IP resource comprising a second IP address and a second port number;
decide on a presence of at least one status function configured to maintain in a table a status associated with a communication on at least one path for a determined lifetime, said at least one path allowing said item of terminal equipment to be reached via said communication network on said second IP address of said item of terminal equipment, wherein deciding on a presence is performed according to data received by the second IP resource in response to the transmission of the first message; and
trigger an action for managing a communication of the item of terminal equipment on said communication network via said path according to said decision.

20. A non-transitory computer-readable medium comprising a computer program product stored thereon comprising program code instructions for implementing a method for managing at least one communication according to a transport protocol of an item of terminal equipment in a communication network, when the instructions are executed by a processor of a management device, said item of terminal equipment being able to access said communication network via at least one IP resource, each IP resource comprising an IP address and a port number, wherein the method comprises:
transmitting in the communication network, by said item of terminal equipment, a first message from at least one first IP resource of said item of terminal equipment to a second IP resource of said item of terminal equipment, said first IP resource comprising a first IP address and a first port number and said second IP resource comprising a second IP address and a second port number, deciding, by the management device, on a presence of at least one status function configured to maintain in a table a status associated with a communication on at least one path during a predetermined lifetime, said at least one path allowing said item of terminal equipment to be reached via said communication network on said second IP address of said item of terminal equipment, wherein deciding on a presence is performed according to data received by the second IP resource in response to the transmission of the first message, and triggering, by the management device, an action for managing a communication of the item of terminal equipment on said at least one path allowing said item of terminal equipment to be reached via said communication network on said second IP address, according to said decision.

* * * * *